(12) United States Patent
Short et al.

(10) Patent No.: US 9,824,065 B2
(45) Date of Patent: Nov. 21, 2017

(54) SYSTEMS AND METHODS FOR CHAOTIC ENTANGLEMENT USING CUPOLETS

(71) Applicant: University of New Hampshire, Durham, NH (US)

(72) Inventors: Kevin M. Short, Durham, NH (US); Matthew A. Morena, Beverly, MA (US)

(73) Assignee: University of New Hampshire, Durham, NH (US)

( * ) Notice: Subject to any disclaimer, the term of this patent is extended or adjusted under 35 U.S.C. 154(b) by 545 days.

(21) Appl. No.: 14/370,445

(22) PCT Filed: Jan. 7, 2013

(86) PCT No.: PCT/US2013/020547
§ 371 (c)(1),
(2) Date: Jul. 2, 2014

(87) PCT Pub. No.: WO2013/103971
PCT Pub. Date: Jul. 11, 2013

(65) Prior Publication Data
US 2015/0025658 A1 Jan. 22, 2015

Related U.S. Application Data

(60) Provisional application No. 61/583,849, filed on Jan. 6, 2012.

(51) Int. Cl.
G05B 11/32 (2006.01)
G06F 17/10 (2006.01)
(Continued)

(52) U.S. Cl.
CPC ......... G06F 17/10 (2013.01); G05B 19/4155 (2013.01); G06F 21/79 (2013.01); G06N 7/08 (2013.01)

(58) Field of Classification Search
CPC ..................................................... G06F 17/10
(Continued)

(56) References Cited

U.S. PATENT DOCUMENTS 5,818,712 A * 10/1998 Glenn, Sr. ............... G06F 17/17
700/38
6,212,239 B1 * 4/2001 Hayes .................... H04L 27/001
375/227

(Continued)

OTHER PUBLICATIONS

Morena, Matthew, and Kevin Short. "Cupolets and a chaotic analog of entanglement." arXiv preprint arXiv:1302.2283 (2013), pp. 1-12.*
Jackson, E. Atlee. "The OPCL control method for entrainment, model-resonance, and migration actions on multiple-attractor systems." Chaos: An Interdisciplinary Journal of Nonlinear Science 7.4 (1997): pp. 550-559.*

(Continued)

*Primary Examiner* — Satish Rampuria
(74) *Attorney, Agent, or Firm* — Finch & Maloney PLLC

(57) ABSTRACT

Systems, methods, apparatus, and techniques are presented for maintaining cupolets in a state of mutual stabilization. A first cupolet and a second cupolet are generated. A first control code is applied to the first cupolet for a first time to produce a first visitation code. The first visitation code is transformed based on an exchange function to produce a second control code. The second control code is applied to the second cupolet to produce a second visitation code. The second visitation code is transformed based on the exchange function to produce the first control code. The first control code is applied to the first cupolet for a second time.

20 Claims, 14 Drawing Sheets

(51) Int. Cl.
  *G06N 7/08* (2006.01)
  *G05B 19/4155* (2006.01)
  *G06F 21/79* (2013.01)
(58) Field of Classification Search
  USPC .................................................. 700/28–89
  See application file for complete search history.

(56) References Cited

U.S. PATENT DOCUMENTS

| | | | | |
|---|---|---|---|---|
| 6,631,166 | B1* | 10/2003 | Carroll | H04L 27/001 331/78 |
| 7,286,670 | B2* | 10/2007 | Short | H03M 7/30 345/555 |
| 2006/0269057 | A1* | 11/2006 | Short | G10L 25/90 380/228 |
| 2008/0152141 | A1 | 6/2008 | Short et al. | |
| 2008/0155141 | A1* | 6/2008 | LaBerge | G06F 13/1689 710/60 |

OTHER PUBLICATIONS

Zarringhalam, Kourosh, and Kevin M. Short. "Generating an adaptive multiresolution image analysis with compact cupolets." Nonlinear Dynamics 52.1-2 (2008): pp. 51-70.*

International Search Report and Written Opinion in International Application No. PCT/US2013/020547 dated Mar. 14, 2013.

"Cupolets and chaotic analog of entanglement," Matthew A. Morena et al. Integrated Applied Mathematics Program, University of New Hampshire, Durham, New Hampshire (Paper presented at the Dynamics Days Conference, Baltimore, MD, Jan. 4, 2012 (retrieved on Feb. 28, 2013) Retrieved from the Internet http://arxiv.org/pdf/1302.2283.pdf).

"Chaotic Computing Through Cupolet Entanglement and Manupilation" Short, Kevin M., et al, Grant Proposal No. N12A-013-0173, Topic No. N12A-T013, University of New Hampshire and Kaonyx Labs, LLC, Mar. 2012.

* cited by examiner

Information for Entangled Cupolets C00001111101001111, C00000001001000001, and C00000111101001111.

(A) Cupolet C00001111101001111 with Visitation Sequence V11110000000000001

| $C_0$ | $C_1$ | $V_0$ | $V_1$ | $E_0$ | $E_1$ |
|---|---|---|---|---|---|
| '00001111101001111' | '00000000000000001' | '00001111111111110' | '11110000000000001' | '00000000000100001' | '00000000000000001' |

(B) Cupolet C00000001001000001 with Visitation Sequence V10001110000011111

| $C_0$ | $C_1$ | $V_0$ | $V_1$ | $E_0$ | $E_1$ |
|---|---|---|---|---|---|
| '00000000000000001' | '00000001000000001' | '01110000111100000' | '01110001111100000' | '00000000000000001' | '00000000000000001' |

(C) Cupolet C00000001000010011 with Visitation Sequence V00011001100000011

| $C_0$ | $C_1$ | $V_0$ | $V_1$ | $E_0$ | $E_1$ |
|---|---|---|---|---|---|
| '00000000000000001' | '00000001000000011' | '11100100111100' | '00011001100000011' | '00000000100000001' | '00000000000000000' |

FIG. 10

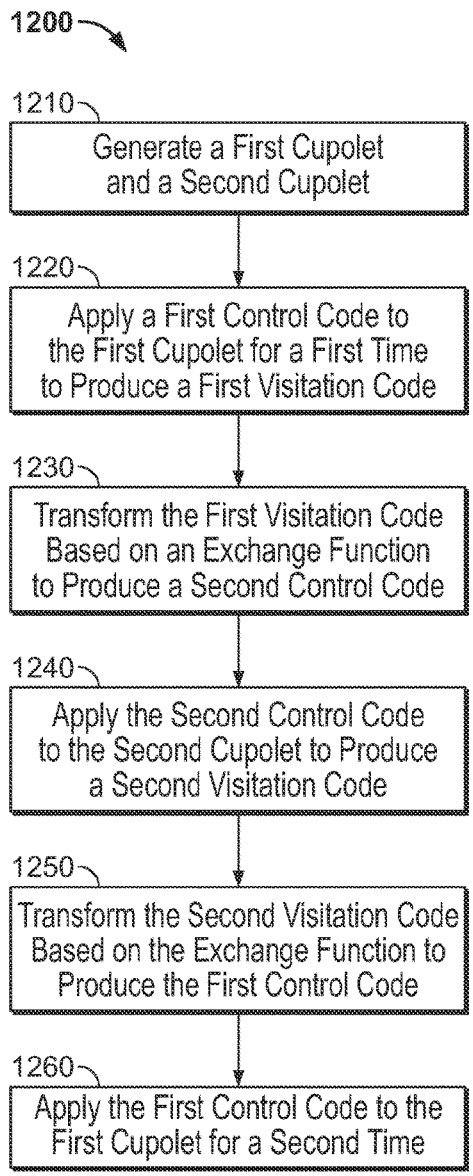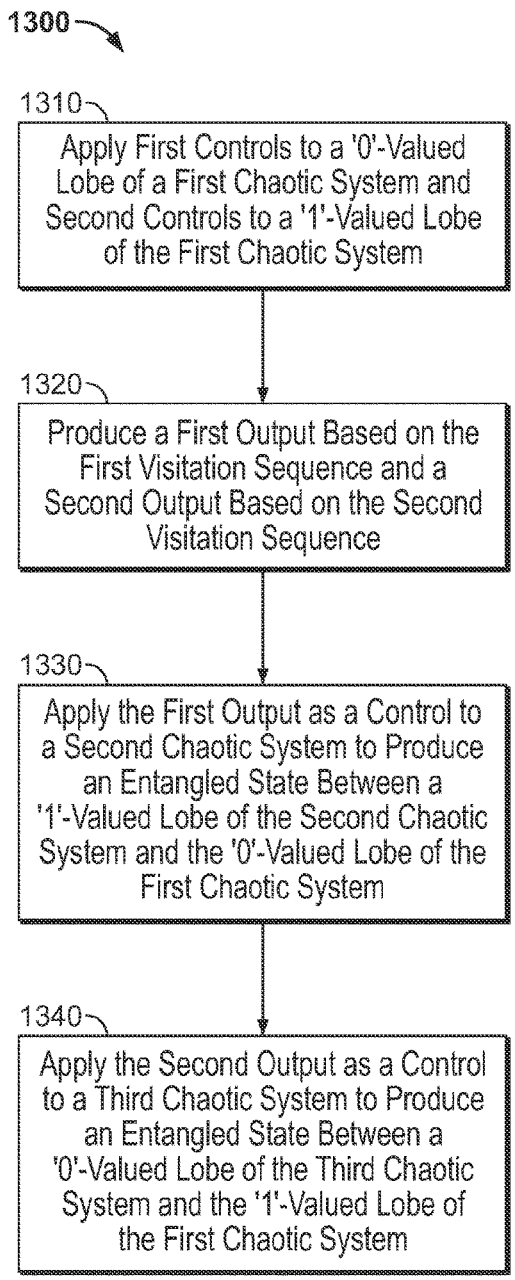
FIG. 12
FIG. 13

SYSTEMS AND METHODS FOR CHAOTIC ENTANGLEMENT USING CUPOLETS

CROSS-REFERENCE TO OTHER PATENT APPLICATIONS

This application is a U.S. Nationalization of PCT Application Number PCT/US2013/020547 filed Jan. 7, 2013, which claims the benefit of U.S. Provisional Patent Application No. 61/583,849, filed Jan. 6, 2012, each of which is hereby incorporated by reference herein in its entirety.

FIELD

This disclosure relates to techniques for controlling and stabilizing otherwise unstable periodic orbits (UPOs) of chaotic systems onto cupolets. More particularly, this disclosure relates to techniques for achieving an analog of entanglement in chaotic systems among cupolets.

BACKGROUND

Both entanglement and chaos theory have emerged as increasingly instrumental in many research areas. Entanglement is used to explain how two or more systems can share an instantaneous and correlated relationship that ignores physical distances. In one formulation, entanglement is said to have occurred when a composite system cannot be written as a product of the states of its component systems. Chaotic behavior, meanwhile, is generally attributed to a system's sensitive dependence on initial conditions and is characterized by its maximal Lyapunov exponent. In particular, the dense set of UPOs that chaotic systems typically admit on an attractor contains a rich source of qualitative information about the dynamical system and numerous control schemes have been designed to extract and stabilize these orbits. It has been said that UPOs constitute "the skeleton of classical and quantum chaos."

SUMMARY

Systems, methods, apparatus, and techniques are presented for cupolets. In some arrangements, circuitry for creating an entangled cupolet pair includes exchange function circuitry and control circuitry. The control circuitry is configured to: apply first controls to a first chaotic system, said first controls causing the first chaotic system to stabilize onto a first cupolet and produce a first visitation sequence, provide the first visitation sequence to the exchange function circuitry, the exchange function circuitry is configured to produce a first output in response to the first visitation sequence, apply the first output as a control to a second chaotic system to produce a second visitation sequence, provide the second visitation sequence to the exchange function circuitry, the exchange function circuitry is configured to produce a second output in response to the second visitation sequence, and apply the second output to the first chaotic system, wherein the second output maintains the first cupolet and the second cupolet in an entangled state.

In some arrangements, a method for maintaining a pair of cupolets in a state of mutual stabilization includes generating a first cupolet and a second cupolet, applying a first control code to the first cupolet for a first time to produce a first visitation code, transforming the first visitation code based on an exchange function to produce a second control code, applying the second control code to the second cupolet to produce a second visitation code, transforming the second visitation code based on the exchange function to produce the first control code, and applying the first control code to the first cupolet for a second time.

In some arrangements, a logic gate includes logic circuitry configured to receive a plurality of input signals to the logic gate, and control circuitry. The control circuitry is configured to generate an entangled cupolet pair, apply the plurality of input signals to the entangled cupolet pair, determine a state of the entangled cupolet pair in response to the plurality of input signals, and provide an output signal of the logic gate in response to the determined state.

In some arrangements, a secure memory device includes generation circuitry configured to generate an cupolet pair, input circuitry configured to receive an input for storage, the input corresponding to a cupolet control code, control circuitry configured to store the control code by applying the control code to the cupolet pair to produce an entangled cupolet pair, and read circuitry configured to receive a read request for the stored control code.

In some arrangements, a method for creating a multi-cupolet entanglement includes: applying first controls to a '0'-valued lobe of a first chaotic system and second controls to a '1'-valued lobe of the first chaotic system, said first controls and second controls together causing the first chaotic system to produce a first visitation sequence associated with the '0'-valued lobe of the first chaotic system and a second visitation sequence associated with the '1'-valued lobe of the first chaotic system, providing the first visitation sequence and the second visitation sequence to the exchange function circuitry, the exchange function circuitry configured to produce a first output in response to the first visitation sequence and a second output in response to the second visitation sequence, applying the first output as a control to a second chaotic system to produce an entangled state between a '1'-valued lobe of the second chaotic system and the '0'-valued lobe of the first chaotic system, and applying the second output as a control to a third chaotic system to produce an entangled state between a '0'-valued lobe of the third chaotic system and the '1'-valued lobe of the first chaotic system.

In some arrangements, a method for creating a multi-cupolet entanglement among a plurality of more than two chaotic systems includes, for each chaotic system in the plurality of more than two chaotic systems: applying controls to a '0'-valued lobe of the chaotic system and to a '1'-valued lobe of the chaotic system, said controls causing the chaotic system to produce a first visitation sequence associated with the '0'-valued lobe of the chaotic system and a second visitation sequence associated with the '1'-valued lobe of the first chaotic system, producing a first output in response to the first visitation sequence and a second output in response to the second visitation sequence, applying the first output as a control to a first neighbor chaotic system in the plurality of chaotic systems to produce an entangled state between a '1'-valued lobe of the first neighbor chaotic system and the '0'-valued lobe of the chaotic system, and applying the second output as a control to a second neighbor chaotic system in the plurality of chaotic systems to produce an entangled state between a '0'-valued lobe of the second neighbor chaotic system and the '1'-valued lobe of the first chaotic system.

BRIEF DESCRIPTION OF THE DRAWINGS

The above and other advantages of the invention will be apparent upon consideration of the following detailed description, taken in conjunction with accompanying drawings, in which like reference characters refer to like parts throughout, and in which:

FIG. 10 depicts information for entangled cupolets C0000111110100111, C00000001001000001, and C0000000100010011 in accordance with an arrangement;

FIG. 12 depicts an illustrative process for maintaining a pair of cupolets in a state of mutual stabilization in accordance with an arrangement;

FIG. 13 depicts an illustrative process for creating a multi-cupolet entanglement among a plurality of more than two chaotic systems in accordance with an arrangement.

DETAILED DESCRIPTION OF THE DISCLOSURE

Figure 1:
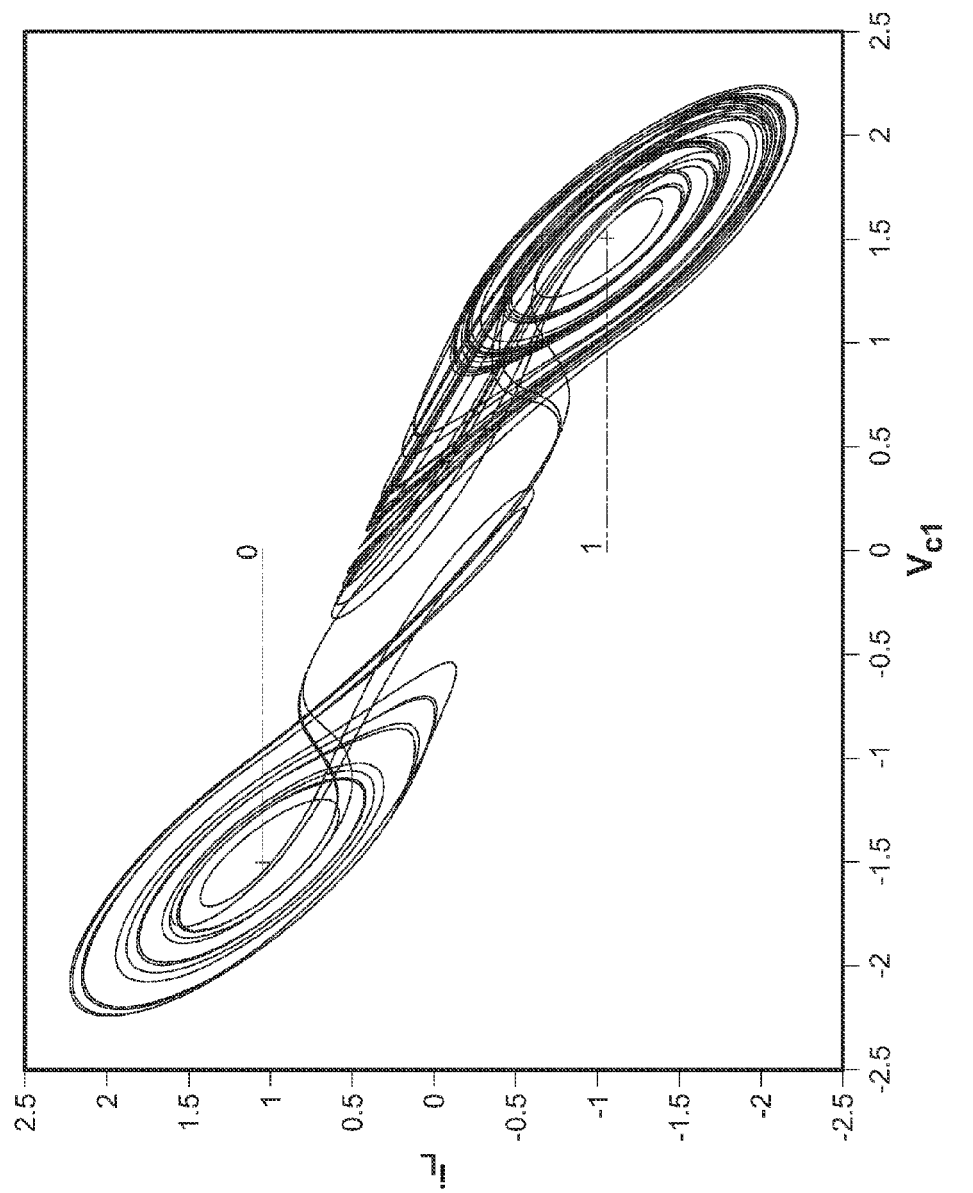
FIG. 1 depicts a double scroll oscillator showing control surfaces in accordance with an arrangement.

Described herein are control techniques that stabilize the UPOs of chaotic systems onto cupolets (a term derived from the phrase chaotic, unstable, periodic, orbit-lets). Cupolets are controlled and stabilized periodic orbits of a chaotic system that would normally be unstable without the presence of the control mechanism. A general discussion of aspects of cupolets consistent with some arrangements of the disclosed systems, methods, and techniques is provided in commonly-assigned U.S. patent application Ser. No. 12/001,961 (now U.S. Pat. No. 8,249,374, issued Aug. 21, 2012), which was filed on Dec. 12, 2007, entitled "SYSTEMS AND METHODS FOR ADAPTIVE MULTIRESOLUTION SIGNAL ANALYSIS WITH COMPACT CUPOLETS," the disclosure of which is hereby incorporated by reference herein in its entirety. Further described herein is an analog of entanglement between cupolets in chaotic systems. For the purposes of illustration, and not limitation, two chaotic systems are regarded as entangled in this disclosure once a two-way coupling exists between their stabilized cupolets. This chaotically-entangled state is self-perpetuating within the control scheme and can be maintained without any external intervention.

In the observation of cupolet entanglement described herein, pairs of cupolets interact through an exchange function. These functions serve as catalysts for the entanglement, and interacting cupolets can become entangled in the sense that they mutually stabilize each other. The most natural form of cupolet entanglement occurs without the aid of an exchange function, or, equivalently, through the identity exchange function whose action is transitive. This is known as pure entanglement and illustrates the potential for cupolet entanglement to occur naturally.

Creating entanglement in a classical, nonlinear setting may indeed be physically realizable because as a chaotic system evolves it visits its entire attractor, including visiting extremely closely its unstable periodic orbits. This enhances the influence the UPOs have and increases the likelihood of one chaotic system interacting with another. Consequently, if an exchange function represents a physical property of the medium or environment in which two interacting chaotic systems are found, then the necessary conditions for entanglement are satisfied and the two systems could chaotically entangle.

Cupolets are a relatively new class of waveforms that were originally detected while controlling a chaotic system in a secure communication application. The process of generating cupolets is briefly discussed before discussing a few of their practical applications. A technique for stabilizing the UPOs of a chaotic attractor uses small controls to induce a chaotic system to produce a signal bearing desired bit stream information. In particular, repeatedly applying a control sequence causes a chaotic trajectory to close up on itself, independent of its initial condition, and stabilize onto a unique periodic orbit (i.e., known as a cupolet). This occurs for nearly all finite control sequences that have been tested. The net effect is that the chaotic system sifts through all possible states until it reaches one where its unstable periodic behavior falls into synchrony with the control sequence, therefore stabilizing the orbit. These controls are arbitrarily small and thus do not significantly alter the topology of the orbits on the chaotic attractor.

As an example, the double scroll oscillator, also known as Chua's oscillator, may be controlled by applying small perturbations on a control surface to steer trajectories around each of the two lobes of the attractor. The differential equations describing this system are Oven by:

$$C_1 \dot{v}_{C_1} = G(v_{C_2} - v_{C_1}) - g(v_{C_1}),$$

$$C_2 \dot{v}_{C_2} = G(v_{C_1} - v_{C_2}) + i_L,$$

$$L \dot{i}_L = -v_{C_2},$$

where $$g(v) = \begin{cases} m_1 v, & \text{if } |v| \leq B_p, \\ m_0(v + B_p) - m_1 B_p, & \text{if } v \leq -B_p, \\ m_0(v - B_p) + m_1 B_p, & \text{if } v \geq B_p, \end{cases}$$

with parameter values $C_1=\frac{1}{9}$, $C_2=1$, $L=\frac{1}{7}$, $G=0.7$, $m_0=-0.5$, $m_1=-0.8$, and $B_p=1$.

Attractors associated with the double scroll equations consist of two lobes, each of which surrounds an unstable fixed point, and which are separated by a transition region. FIG. 1 shows a typical trajectory tracing out the attractor of this system as well as the positions of two control planes that emanate outward from the center of each lobe. In particular, FIG. 1 depicts a double scroll oscillator showing control surfaces in accordance with an arrangement. The control planes are assigned the values 0 and 1, and, as the chaotic system traces out a trajectory, a binary sequence of lobe visits can be recorded. This binary sequence is referred to as the visitation sequence. The first step in generating cupolets is to specify a Poincaré surface of section on each lobe by $$i_L = \pm GF \text{ and } |v_{C_1}| \leq F,$$

where $$F = \frac{B_P(m_0 - m_1)}{(G + m_0)}.$$

These two Poincaré sections are used as the control planes whenever trajectories of the system are being controlled. Although each Poincaré section is two-dimensional, the attractor is locally nearly two-dimensional, and so their intersection is approximately one-dimensional. This allows the intersection to be partioned into M equally spaced bins and the distance from the center of each bin to the center of the corresponding lobe to be recorded. Each bin center is then used as a starting point from which the chaotic system is simulated without control so that, after N loops around the attractor, one obtains a visitation sequence for each bin center. Such sequences are represented by a coding function, $r_N(x)$, which maps an initial condition, x, to a binary representation of its future visitation sequence. More precisely, if x results in the visitation sequence $b_1 b_2 b_3 \ldots$ (where $b_i$ is either 0 or 1, representing a visit to lobe 0 or lobe 1, respectively), its sequence is mapped to the binary decimal $0.b_1 b_2 b_3 \ldots$ with $r_N(x)$ defined by $$r_N(x) = \sum_{n=1}^{N} \frac{b_n}{2^n}.$$

Figure 2:
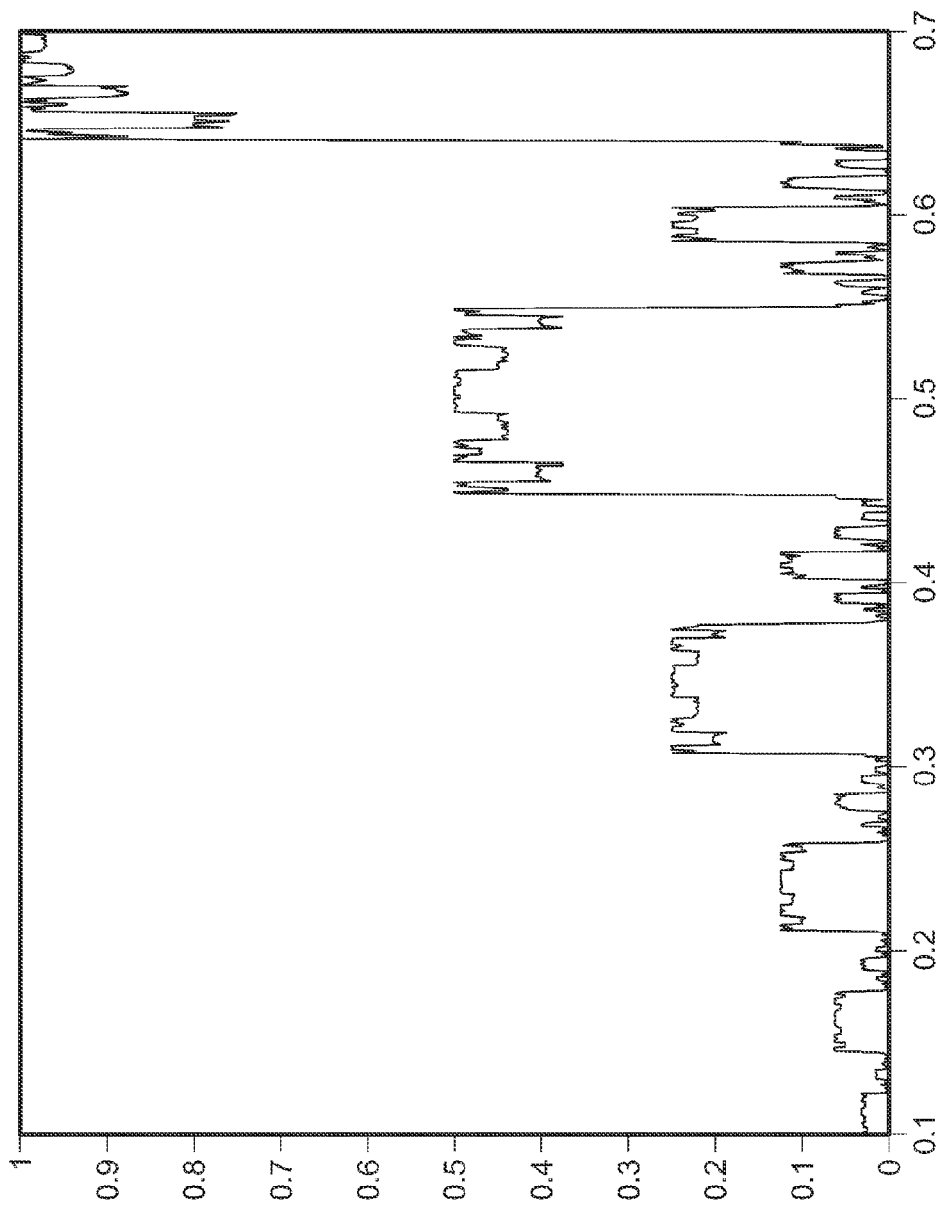
FIG. 2 depicts a coding function $r_N(x)$ in accordance with an arrangement.

In this manner, both $r_N(x)$ and the future visitation sequence of every bin center on each Poincaré section are known for N-many iterations. FIG. 2 shows a plot of this symbolic state function. In particular, FIG. 2 depicts the coding function $r_N(x)$ in accordance with an arrangement.

The next step of the method is to run the simulation until a trajectory crosses the Poincaré surface, at $x_0$ say. The goal is to steer the trajectory through $x_0$ so that in the future the trajectory traces out a desired visitation sequence determined by the bits in a message bit stream. Thus, if the last digit of the visitation sequence of $x_0$ is the same as the first digit of the desired message, the trajectory is allowed pass through the control plane (essentially) unperturbed and continue to evolve until it next intersects a Poincaré section. Otherwise, $r_N(x)$ is searched for the bin center nearest to $x_0$ having the same visitation sequence as $x_0$ except for the last digit. More precisely, an $x_1$ is located that is on the same Poincaré line segment as $x_0$ with $|r_N(x_0) - r_N(x_1)| = 2^{-N}$, and then the trajectory is perturbed to start at the new point, $x_1$. These perturbations are known as macrocontrols and are guaranteed to be small. This control scheme defines the macrocontrol perturbations to have a similar dynamical impact after N loops around the attractor.

On the other hand, in every unperturbed situation, microcontrols reset the trajectory to the center of the bin where it intersects the control plane. This not only minimizes the accumulation of round-off error and the system's sensitivity to initial conditions, but also suggests that some cupolets may intersect. As will be discussed further below, this intersection would occur exactly in the center of a bin and can be used in some applications to jump from one UPO to another. More generally, the process of controlling a chaotic system occurs whenever a trajectory crosses one of the control planes. The option to perturb the trajectory or allow it to pass freely through the control plane is described by a unique, binary control sequence with 1 meaning apply a macrocontrol and 0 meaning apply only a microcontrol. In almost all cases, if a finite sequence of control bits, known as a control code, is applied repeatedly, the system will stabilize onto a unique periodic orbit regardless of its initial state. These approximate chaotic unstable periodic orbits are called cupolets.

FIGS. 3A-3D together depict four cupolets of various periods belonging to the double-scroll oscillator in accordance with an arrangement. In particular, FIGS. 3A-3D illustrate cupolets of periods one (FIG. 3A), two (FIG. 3B), five (FIG. 3C), and twenty-four (FIG. 3D), respectively. This control technique is implemented in order to produce stabilized periodic orbits by sending in all possible sequences of control bits with initial conditions in all possible control bins in order to generate a finite, but sufficiently large set of cupolets. That these orbits are thus produced from such small perturbations suggests that they are shadowing true periodic orbits and theorems have been developed to establish conditions under which this holds. Several other chaotic systems such as the Lorenz and Rossler systems have also been used to generate cupolets and similar results hold in two-dimensional discrete unimodal maps.

Figure 3A:
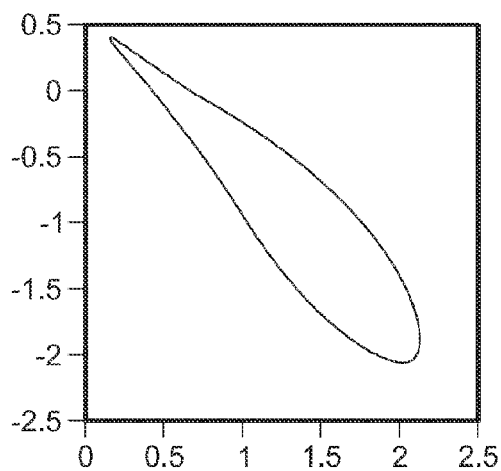
FIGS. 3A-3D together depict four cupolets of various periods belonging to the double-scroll oscillator in accordance with an arrangement.
Figure 3B:
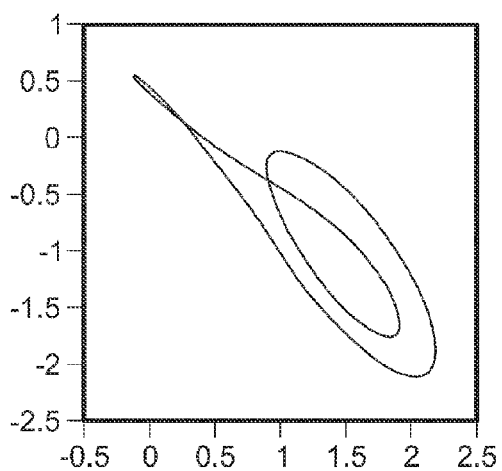
Figure 3C:
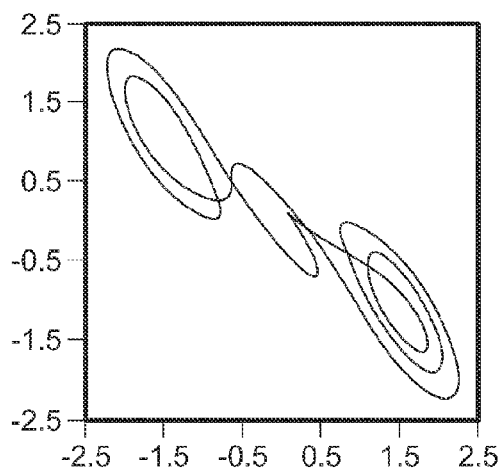
Figure 3D:
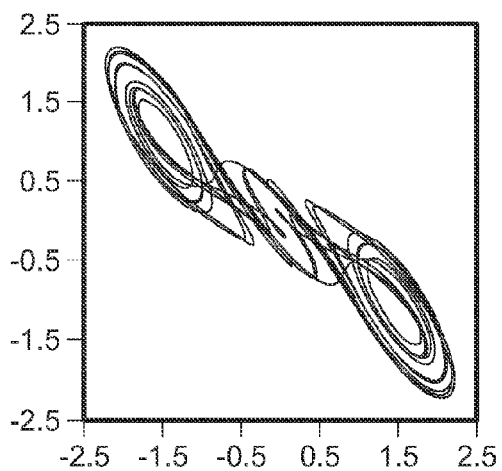

For organizational purposes, a naming convention is adopted for the cupolets that incorporates the control codes used to generate them. For instance, the cupolet shown in FIG. 3C is stabilized by repeatedly applying the control code '00001' and is thus named C00001. The naming scheme for a cupolet's visitation sequence is similar: the visitation sequence of this cupolet is '00111' so it is saved as V00111. A single period of a visitation sequence either has the same length as one period of its cupolet's control code, or is an integer multiple of that period. With reference to FIGS. 3A-3D, the illustrated cupolets have control codes of COO (FIG. 3A), C11 (FIG. 3B), C00001 (FIG. 3C), and C001 (FIG. 3D), respectively. It should be noted that this cupolet-generating scheme is very effective as over 8,000 cupolets may be stabilized very quickly using only 16-bit or shorter control codes.

These cupolet and visitation sequence libraries are further organized by integrating their periodic and cyclic properties into a single file-naming scheme. First, as both are periodic, all of the relevant information of a control code or a visitation sequence is found in their first periods which thus permits them to be condensed to a single period. For instance, C11011010 is used instead of C1101101011011010 and V11100111 is used instead of V1110011111100111. Rotation is also allowed within a control code without affecting the cupolet's stability as all cyclic permutations of a finite control code are equivalent (once any initial transient has passed). By convention, a control code will be rotated so that its lowest numerical value is returned, and, since the cupolets themselves are periodic, visitation sequences may also be rotated in this fashion. As a result, this same cupolet control code and visitation sequence pair, C11011010 and V11100111, are recorded as C01011011 and V00111111 respectively. A control code or visitation sequence (or emitted sequence, described later) is referred to as fully formatted if it has been rotated and periodically reduced in this manner.

As mentioned above, cupolets originated from an application of secure communication but they are particularly useful in other research areas as well. Cupolets are practical for at least the reason that very little information is required in generating cupolets (typically 16-bit control codes are used), the large degree of diversity present in their frequency spectra, and how accessible their dynamical behaviors are via small controls.

Figure 4:
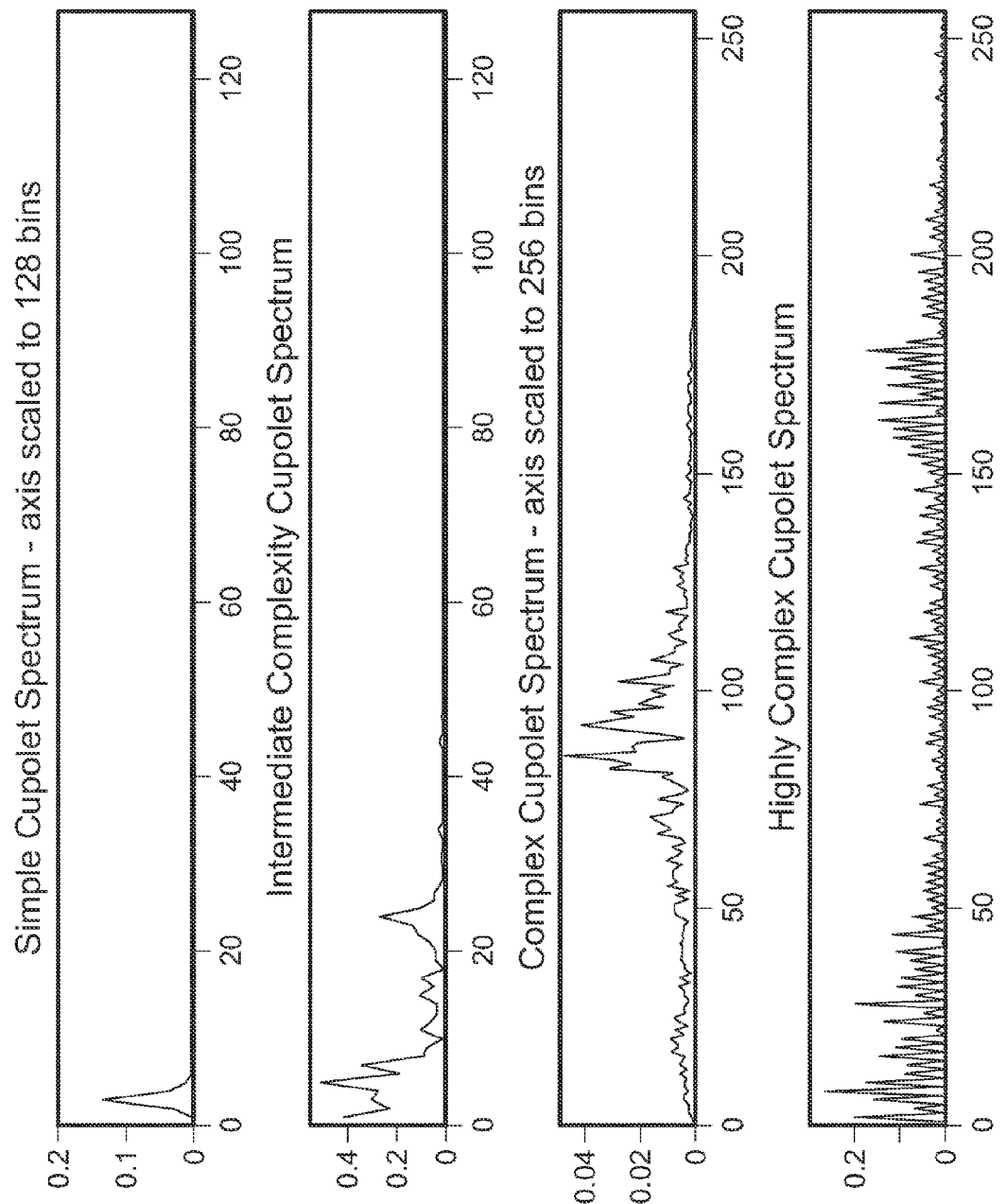
FIG. 4 depicts the high diversity in spectral signatures found among four representative cupolets in accordance with an arrangement.
Figure 5:
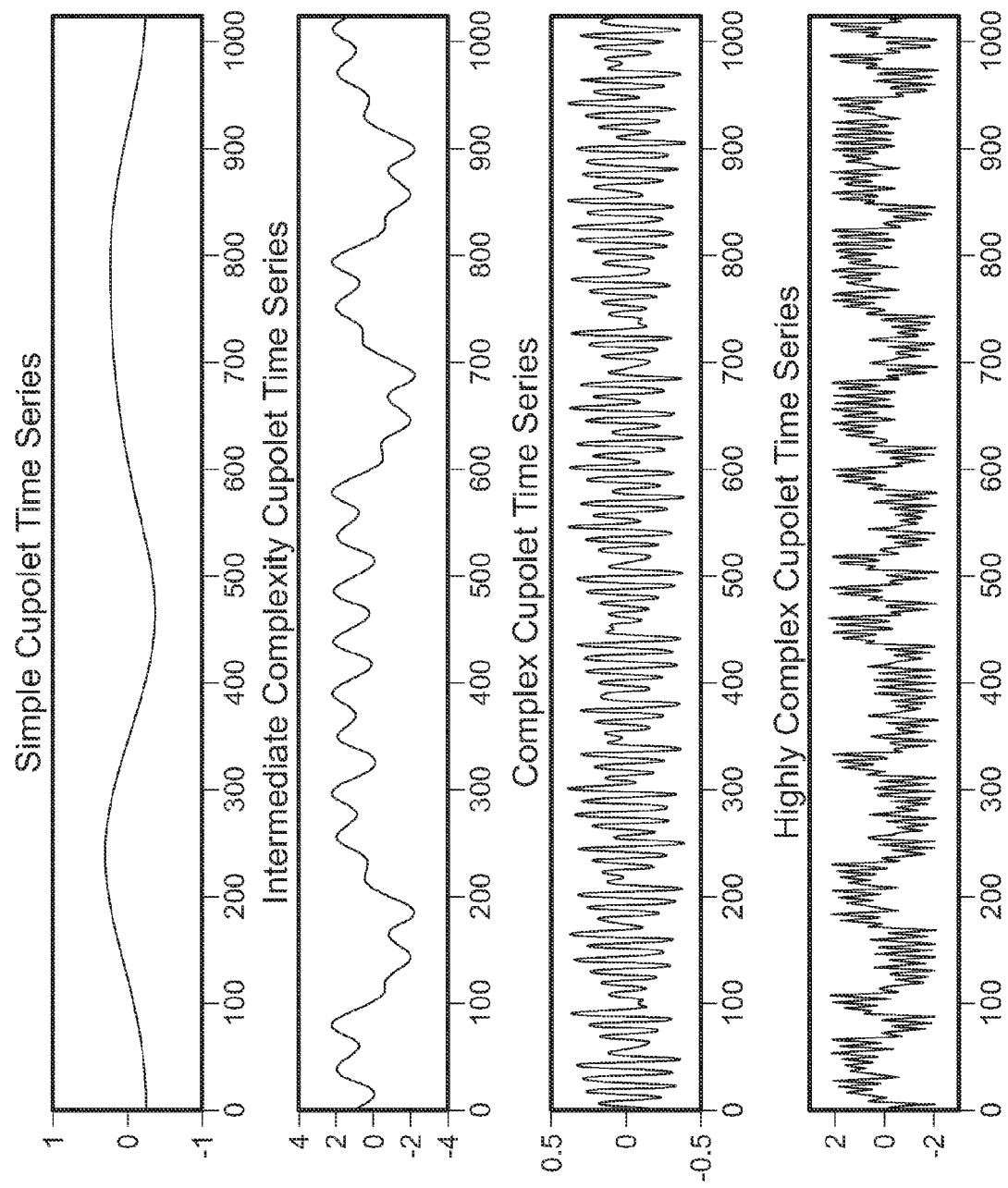
FIG. 5 depicts time-domain variations for each of the cupolets depicted in FIG. 4 in accordance with an arrangement.

FIG. 4 depicts the high diversity in spectral signatures found among four representative cupolets in accordance with an arrangement (the horizontal axes are the frequency bins of the corresponding FFT). The data is taken from the FFT of a single period of oscillation of each cupolet, using only one coordinate over time. The corresponding time domain representations can be seen in FIG. 5. FIG. 5 depicts time-domain variations for each of the cupolets depicted in FIG. 4 in accordance with an arrangement (the horizontal axes are units of time, in samples, and again only one coordinate is used). As depicted by FIGS. 4 and 5, cupolets are fundamentally very rich in structure and may be used to generate a variety of different waveforms ranging from a simple, nearly sinusoidal wave with a single dominant spectral peak to more involved waveforms that consist of hundreds of harmonics. Thus, the cupolets provide a diverse family of basic waveforms that can be very useful in modeling complicated data sources, making them particularly suited for applications involving image and music compression.

Two theoretical results are now mentioned. First, observing that cupolets exist naturally in an oscillatory state resembling the sinusoidal basis elements of Fourier analysis, it has been demonstrated how to transform a set of cupolets into wavelet-like waveforms and then into an adaptive basis for the space of real-valued functions of a discrete variable. This introduced cupolets into applications of image processing and data compression. Additional cupolet research has established how to transition efficiently between cupolets. The cupolet control scheme described above allows for trajectories to be perturbed through the same bin of a control plane, hence, making it possible for some cupolets to intersect. Switching between a pair of intersecting cupolets may be performed by way of a smooth and continuous transition, but for non-intersecting cupolets, a graph-theoretic approach is used to determine an effective transition sequence between the cupolets in order to avoid significant chaotic transients during the transition period.

Next is shown a way of entangling two interacting chaotic systems by controlling a pair of their cupolets into a state of mutual stabilization. In many cases, the entanglement is mediated by an exchange function that manages the interaction between the cupolets in order to first induce and then maintain their entanglement. An exchange function operates on a cupolet's visitation sequence and transforms it into another bitstream, known as the emitted sequence, that interacts with a second chaotic system. The emitted sequence is then taken as a control code and is used to stabilize the second chaotic system onto another cupolet. If this second cupolet then interacts through the same exchange function to produce an emitted sequence that serves as the control code for the first cupolet, the two cupolets become locked in a mutually supporting feedback loop and are thus considered to be chaotically entangled. In a manner that is analogous to the properties of quantum entanglement, any slight disturbance in either their interaction or in their stabilization may be enough to compromise the cupolet entanglement. Further, the states of both members of an entangled pair are deterministically-linked, meaning that applying a measurement to one immediately determines the state of the other. In order to simplify the discussion, the naming convention for control codes and visitation sequences is extended to emitted sequences, with the letter 'E' being prepended to each emitted sequence.

Figure 6:
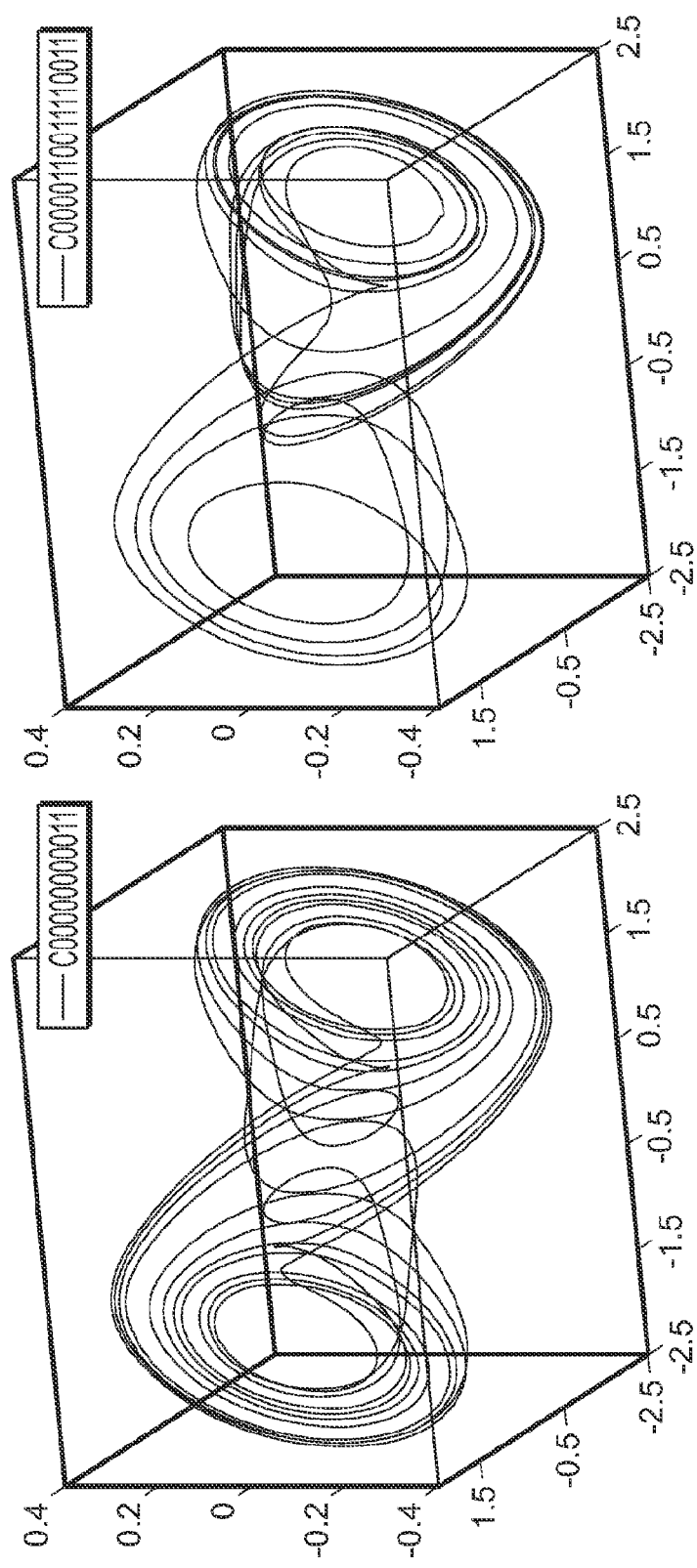
FIGS. 6A and 6B together depict entangled cupolets C00000000011 and C0000110011110011 with visitation sequences V00000111000111111000111 and V0000111111111111, respectively, in accordance with an arrangement.

The method of chaotic entanglement may be illustrated by an example. FIGS. 6A and 6B together depict entangled cupolets C00000000011 and C00001100111110011 with visitation sequences V000001110001111000111 and V00001111111111111, respectively, in accordance with an arrangement. To generate entanglement between the cupolets shown in FIGS. 6A and 6B, two double scroll oscillators, Systems I and II, are first simulated without control. In order to stabilize one of the cupolets, say C00000000011, the control code '00000000011' must be applied to System I. After C00000000011 completes one full period around the attractor, its fully formatted visitation sequence, V000001110001111000111, is obtained. The visitation sequence is then passed to an exchange function where it is modified according to a predefined binary operation and sent to System II as an emitted sequence. Exchange functions are described more fully below. In this example, a 'complement' exchange function converts V000001110001111000111 into the emitted sequence E0000110011110011 essentially by interchanging ones and zeros for zeros and ones, respectively. As it passes from the exchange function, the emitted sequence is then applied to System II as a control code that can stabilize this system onto another cupolet.

In this case, System II stabilizes onto a second cupolet, C0000110011110011, since the emitted sequence, E0000110011110011, actually is this cupolet's control code. The cupolet interaction is now repeated in the reverse direction. The visitation sequence of cupolet C0000110011110011 is found to be V00001111111111111, and then is passed to the same exchange function and converted to the emitted sequence E00000000011. When applied to System I as a control code, E00000000011 will preserve the stability of the first cupolet, C00000000011, because the emitted bits, '00000000011', match the control information needed to generate this cupolet. In fact, both emitted sequences, E00000000011 and E0000110011110011, match the required control codes for cupolets C00000000011 and C0000110011110011, respectively. This defines the cupolets' interaction which has been managed by the exchange function and which demonstrates how their dynamics become mutually stabilizing. The continued interaction through the exchange function guarantees each cupolets stability, and the pair is thus considered entangled. This particular entangled cupolet example is illustrated in FIGS. 6A and 6B.

On a less technical level, a pair of cupolets, $C_A$ and $C_B$, chaotically entangles whenever the cupolets' visitation sequences mutually preserves the other's stabilization. As $C_A$ winds its way about the lobes of its attractor, the bits of its visitation sequence are passed to the exchange function which produces the emitted bits that then go on to control $C_B$. In the reverse direction, the visitation sequence belonging to $C_B$ passes through the same exchange function and is emitted as control bits for $C_A$, and these are exactly the necessary control code bits needed to maintain its stabilization.

Subtle disruptions in the cupolets' interaction will almost always destroy their entanglement, unless a great deal is known about the control scheme. For instance, consider the process of making a measurement on an entangled cupolet that has the effect of interchanging a 0 for a 1 or vice versa. Control codes are unique since they direct a chaotic system onto one specific cupolet. Without knowledge of the control scheme, such a small disturbance to cupolet $C_A$'s control code would perturb its trajectory into a different bin on the control plane. Either $C_A$ would then destabilize or it would transition to a different cupolet as described above. In either scenario, a different visitation sequence is produced which no longer guarantees the stability of cupolet $C_B$, and so their entangled state is lost.

Figure 7:
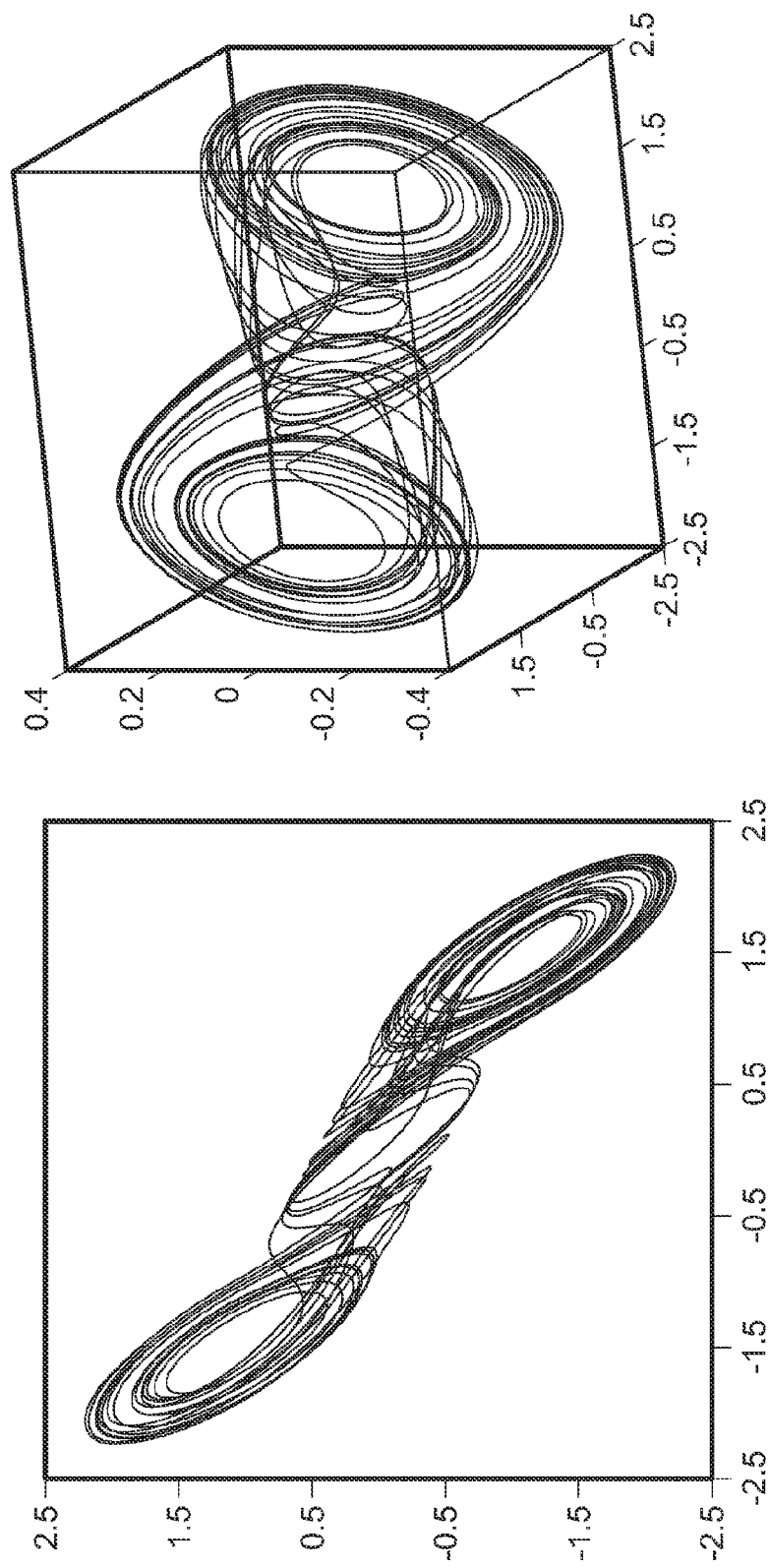
FIG. 7 depicts a purely self-entangled cupolet having control code C00000000000000000000000 1111111111111111100011111000110011 with a period-56 visitation sequence, V00000000000000000000000 1111111111111111100011111000110011 in accordance with an arrangement.

Next is described an instance of cupolet entanglement which occurs without the need for an exchange function (or, alternatively, via the Identity exchange function) in a situation where a visitation sequence is directly applied as a control code to a chaotic system with no modification made to its bitstream. This type of entanglement will be referred to as pure entanglement, and has been found between two copies of the cupolet shown in FIG. 7. In particular, FIG. 7 depicts a purely self-entangled cupolet having control code C00000000000000000000001111111111111111100011111 000110011 with a period-56 visitation sequence, V00000000000000000000001111111111111111100011111 000110011 in accordance with an arrangement.

Recall that for a cupolet to remain stabilized, all that is required is the repeated application of its control code to its system. In this situation, each cupolet is constantly generating the exact control information needed to maintain its partner's periodic trajectory simply by transmitting bits of its visitation sequence. Such behavior requires no intermediary exchange function or environmental property in order to be sustained and raises the prospect of spontaneous entanglement that can be generated intrinsically by the dynamics of a chaotic system. This is discussed further below, where some relations between chaotic and quantum systems are discussed.

Thus, there exists a non-zero probability of pure entanglement occurring between two chaotic systems, which in turn suggests that this entanglement could arise naturally in either classical or quantum systems. This may not be altogether surprising given that instances of natural and macroscopic quantum entanglement have recently been verified experimentally. That it is generated without any assistance from an exchange function makes pure entanglement the simplest form of cupolet entanglement. Entanglement induced with the aid of an exchange function, as discussed next, may be considered a variation of pure entanglement because a nontrivial operation is performed on a cupolet's visitation sequence in order to generate the necessary emitted sequence for controlling a second chaotic system.

Exchange functions manage the interaction between chaotic systems and, when possible, induce and then preserve the stability of any entangled cupolet pairs. This is accomplished by modifying a visitation sequence and emitting it as a cupolet-stabilizing control code. Many exchange function categories are inspired by models of physical systems and many give rise to techniques that are easily implemented through linear shift registers or filters.

Nearly any binary operation will define an exchange function, though not every exchange function will generate entanglement between cupolets. Each exchange function must preserve causality by processing the bits of a visitation sequence in the order that they are received, as well as by preserving the order of the emitted sequence bits that are outputted. Although every category employs a different binary operation, each exchange function iteratively passes a visitation sequence through a bit register. Whether a certain condition is satisfied by the bits inside the register determines the binary response the exchange function makes as bits of the emitted sequence. By varying the function parameters (e.g., bit register length or details of the condition requirements), one may create many exchange functions within a particular exchange function category.

Next, a necessary periodicity property required for each exchange function is discussed along with several exchange function categories which are physically realizable (descriptions of additional categories are provided below). In order to illustrate how the exchange functions would modify a visitation sequence, an example exchange function is selected from each of these categories and applied step-by-step to a particular visitation sequence. A cupolet is referred to by its control code, $Cc_1c_2c_3\ldots$, a visitation sequence by $Vv_1v_2v_3\ldots$, and an emitted sequence by $Ee_1e_2e_3$, where $c_i$, $v_i$, and $e_i$ are binary values.

When describing an exchange function's operation on a visitation sequence, the terminology "register" is used synonymously with the phrase "state of the register" to refer to the contents of the bit register at a particular instance. Three positive, integer-valued parameters, L, M, and N, have universal meaning wherever they are used in exchange functions as described herein. They define the relation 'N out of M to L' (similarly, 'N out of M' or 'M to L', if L or N are not present), meaning that an M-bit register is used to transform M-many visitation sequence bits into L-many emitted sequence bits, provided that at least N-many of the visitation sequence bits satisfy the condition that is associated with the exchange function.

It is useful to understand the role that periodicity plays when simulating the operation of an exchange function numerically. First, visitation sequences are periodic so whenever a register encounters a subsequence whose length is less than that of the register, the entire visitation sequence is concatenated to itself in order to ensure a full register. Second, because the cupolet-stabilizing control codes are both cyclic and periodic, emitted sequences must be as well and the exchange functions must therefore respect both of these properties when converting a visitation sequence into an emitted sequence. This means that even though the exchange function may have cycled through a complete period of a visitation sequence, its action must continue until periodicity is detected within the resulting emitted sequence. In some cases, an initial subsequence of bits belonging to a calculated emitted sequence does not contribute to the periodicity of its emitted sequence. These are known as transient bits and are instead associated with any initial transient a trajectory must undergo prior to its stabilization onto a cupolet. Since they do not directly contribute to stabilizing a cupolet, transient bits may be discarded from their emitted sequence without a loss of control information. As a result, emitted sequences may thus be rotated and reduced to a single period, as is done when cupolet control codes and visitation sequences are fully formatted.

A first class of exchange function is referred to as an integrate-and-fire exchange function. The integrate-and-fire exchange function class, denoted also by IntegrateAndFire (N,M), is inspired by various investigations of chaos in neuron models. In particular, bits of a visitation sequence are interpreted as binary energy, their numerical sum as cumulative energy, and the bins inside the register as units of time (empty bins contain zero energy). In this setting, a threshold condition, 'N units of energy out of M units of time' is placed upon length-M subsequences of a visitation sequence. If the energy inside the register reaches the threshold level, N-many ones from M-many bits, the exchange function outputs a single one to the emitted sequence to indicate that the system has fired. For a nerve cell belonging to an active neural network, its next step after a fire is to clear its energy to zero so that the cell may immediately begin to accumulate new energy.

Similarly, in the integrate-and-fire exchange function class, the bit register is reset after a fire by first emptying all of the register bins and then shifting in the next bit of the visitation sequence whereupon these modification steps are repeated. Until the cumulative energy inside the register reaches the threshold level, the exchange function, like a neuron, does not fire. Instead, the exchange function outputs a single zero as the next bit of the emitted sequence. The bits inside the register then advance one bin which prompts the lead register bit to shift out of the register so that the next bit of the visitation sequence may shift in. The register's energy level is then recomputed so that this energy analysis can be repeated.

For example, if the IntegrateAndFire(3,4) exchange function were to operate on the visitation sequence $Vv_1v_2v_3 \ldots v_{17}$=V00000011110011111, the resulting emitted sequence would be E00000000001000001. In this scenario, a 'fire' is achieved whenever N=3 ones are found inside an M=4 bit register. Working bitwise from left to right, the first register (i.e., the state of the register) is $WWWv_1$=WWW0, with a box representing an empty register bin. Since no binary energy is found inside the register, the first emitted sequence bit is $e_1$=0. When $v_1$ is shifted forward one bin to make room for $v_2$=0 and then again for $v_3$=0, the subsequent registers are $WWv_1v_2$=WW00 and $Wv_1v_2v_3$=W000. No energy is available in either register so $e_2$ and $e_3$ are both zero. In fact, the next three registers do not contain any energy and $e_4$, $e_5$, and $e_6$ are zero as well. Although, the seventh and eighth registers, $v_4v_5v_6v_7$=0001 and $v_5v_6v_7v_8$=0011, each contain units of energy, it is not enough to meet the threshold condition and $e_7$=0=$e_8$.

At this point, the emitted sequence is $e_1 \ldots e_8$=00000000. The ninth register, $v_6v_7v_8v_9$=0111, contains a total of three units of energy. This meets the energy threshold, causing the exchange function to simulate a neural 'fire' by outputting a single one to the emitted sequence ($e_9$=1). After the register clears its bins, it accepts the next bit of the visitation sequence, $v_{10}$, giving $WWWv_{10}$=WWW1 and $e_{10}$=0. Note that it is not until the fifteenth iteration that the exchange function next fires, whereupon the register is $v_{12}v_{13}v_{14}v_{15}$=0111 and hence $e_{15}$=1. Upon resetting, the next two registers are $WWWv_{16}$=WWW1 and $WWv_{16}v_{17}$=WW11 (so $e_{16}$=0=$e_{17}$), but in order to fill the eighteenth register, periodicity of the visitation sequence must be applied to give $Wv_{16}v_{17}v_1$=W110 inside the register. Thus, $e_{18}$=0.

Bits continue to shift in and out of the register without a fire ($e_{19}$=0=$e_{20}$), but when the register accumulates $v_1v_2v_3v_4$ in its twenty-first iteration, this particular register state has been encountered previously as the fourth register in the modification process. As any additional iterations will only repeat bits $e_4$ thru $e_{20}$, periodicity is thus detected within the emitted sequence, $$e_1e_2e_3\overline{e_4\ldots e_{20}}=00000000100000100000.$$

(where the overbar indicates a repeating sequence). Bits $e_1$, $e_2$, and $e_3$ are discarded as transient bits, and the emitted sequence is stored as E00000000001000001.

A second class of exchange function is referred to as a preponderance exchange function. The preponderance exchange function class, denoted also by Preponderance(N, M,L), also interprets the bits of a visitation sequence as binary energy. As with the IntegrateAndFire functions, an energy threshold is placed on an M-bit register where at least N-many ones inside the register determines a preponderance condition. If the threshold is satisfied, a Preponderance exchange function appends a sequence of L-many ones to the emitted sequence. Otherwise, a sequence of L-many zeros is sent to the emitted sequence. After either result, the register resets by clearing its bins in order to admit the next block of M-many visitation sequence bits so that the modification process can continue. Preponderance functions thus proceed along a visitation sequence block-by-block, rather than bit-by-bit, and allow for L>1.

To demonstrate, the Preponderance(3,4,2) exchange function is applied to the visitation sequence V00011100011111000111. Here, register blocks of M=4 bits are replaced by L=2 ones ('11'), provided that at least N=3 of the M=4 bins in the register contain binary energy. Otherwise, the register block is substituted for L=2 zeros ('00'). The length of this particular visitation sequence is 20, so it is straightforward to analyze four-bit registers. The first block, $v_1v_2v_3v_4$=0001, contains only a single unit of energy and the emitted sequence thus begins as $e_1e_2$=00. The next block, $v_5v_6v_7v_8$=1100, has only two ones so $e_3e_4$=00. The third register is $v_9v_{10}v_{11}v_{12}$=0111, and because its cumulative energy equals the threshold, $e_5e_6$=11. Since the next block, $v_{13}v_{14}v_{15}v_{16}$=1100, does not meet the minimum energy level, $e_7e_8$=00. The final block is $v_{17}v_{18}v_{19}v_{20}$=0111, which does satisfy the energy requirement and $e_9e_{10}$=11. This exchange function need not be simulated any further since its next register, $v_1v_2v_3v_4$, has been analyzed earlier. The emitted sequence is therefore E0000110011, which is already fully formatted. There are no transient bits in this example.

A third class of exchange function is referred to as a logic gate exchange function. The logic gate exchange function class, denoted also by LogicGate(OPERATION,L), is motivated by the anticipated practical application of cupolet entanglement to chaotic computation. The LogicGate(OPERATION,L) category applies a specific logic operation to consecutive bits of a visitation sequence. These exchange functions thus utilize a bit register of length two and pass the visitation sequence through block-by-block. Table 1 describes several logic operations and their outputs. Truth table of basic logic operations for the binary input pair, $I_1$ and $I_2$ is

TABLE 1

| $I_1$ | $I_2$ | NAND | NOR | XOR | AND | OR | XNOR |
|---|---|---|---|---|---|---|---|
| 0 | 0 | 1 | 1 | 0 | 0 | 0 | 1 |
| 0 | 1 | 1 | 0 | 1 | 0 | 1 | 0 |
| 1 | 0 | 1 | 0 | 1 | 0 | 1 | 0 |
| 1 | 1 | 0 | 0 | 0 | 1 | 1 | 1 |

Binary inputs $I_1$ and $I_2$ are taken from a visitation sequence and are converted into a single bit by a specific logic operation. After the operation is performed, its output is repeated L-many times, and then appended to the resulting emitted sequence. The register then resets to accept the next pair of visitation sequence bits and allow the above modification process to repeat. To demonstrate, the LogicGate ('XOR',3) exchange function is applied to the visitation sequence V000111111, which is realized from the cupolet C001011011. The bit register first accumulates the subsequence $v_1v_2$=00 before applying the logic 'XOR' operation. According to Table 1, XOR(0,0)=0, which is then repeated to produce the L=3 zeros, $e_1e_2e_3$=000. In the second register, $v_3v_4$=01 and, since XOR(0,1)=1, $e_4e_5e_6$=111.

The next two registers, $v_5v_6$=11=$v_7v_8$, give $e_7 \ldots e_{12}$= 0 ... 0. Periodicity of V000111111 is now utilized in order to continue simulating the exchange function, and results in $v_9v_1$=10 for the next register. Hence, $e_{13}e_{14}e_{15}$=111. Since $v_2v_3$=00 and $v_4v_5$=11 are the next two registers, $e_{16} \ldots e_{21}$= 0 ... 0. The next register is $v_6v_7$=11, and thus $e_{22}e_{23}e_{24}$=000. Finally, $v_8v_9$=00 (so $e_{25}e_{26}e_{27}$=000), and the simulation of the exchange function may stop as $v_1v_2$=00 has been encountered previously as the exchange function's first register. Because of this, there are no transient bits and once the emitted sequence is fully formatted, it is saved as E000000000000000111000000111.

Many exchange functions operate essentially by modeling a visitation sequence as energy information with the 1-lobe of the double scroll attractor acting as an analog of an energy source and the 0-lobe as a neutral source. When a cupolet visits its 1-lobe, energy is accumulated in its visitation sequence whereas the energy level remains constant after any 0-lobe visits. IntegrateAndFire and Preponderance exchange functions thus become energy indicators as they only fire once a cupolet has visited its energy source sufficiently often. If enough energy is represented in that part of the visitation sequence, the cupolet is able to induce perturbations onto other cupolets. Should not enough energy be accumulated, then these exchange functions produce a section of the emitted sequence that does not have sufficient energy to effectively control another system. Many exchange functions therefore resemble discrete finite impulse response (FIR) filters from signal processing since an output (cumulative energy) is obtained from a weighted sum of the current and previous bits (energies) of a visitation sequence. In this way, the exchange functions are simpler to realize computationally, hence, making cupolet entanglement further suited to practical applications. Additional exchange function categories are described below and include the Complement, the NOutOfMtoL, and the ZerosAndOnes categories.

As their names suggest, Complement(M,L) exchange functions substitute subsequences of a visitation sequence for complementary subsequences. The length of the original subsequence and its replacement need not be the same (M≠L), but both zeros and ones subsequences are replaced by a complement subsequence of the same length. For instance, during a 4-to-2 reduction (M=4,L=2), the subsequences '1111' and '0000' are each replaced by subsequences of length L=2, '00' and '11', respectively. When L>M, Complement exchange functions expand a visitation sequence. More generally, a Complement exchange function begins by admitting a block of M-many visitation sequence bits into its register which is then checked to see if it is either completely filled by only ones or zeros. If so, then this entire block of subsequence bits is replaced by its length-L complement subsequence and passed from the register as the next bits of the emitted sequence. The register then resets by clearing its bins and accumulating the next M-block of visitation sequence bits. If no such subsequence exists inside the register, the leading register bit is ejected without any modification to become the next bit of the emitted sequence. The visitation sequence then advances one bit through the register for the above operation to repeat.

To illustrate this process, consider passing $Vv_1v_2v_3 \ldots v_{17}$=V00000011110011111, the visitation sequence belonging to the cupolet C000100011, to the Complement(5,2) exchange function. Since the visitation sequence's first five bits are all zeros, they meet the condition necessary for a complement modification to occur and are converted into a pair of ones, $e_1e_2$=11. The register then accumulates the next block of five bits, $v_6v_7v_8v_9v_{10}$=01111, but this does not meet the requirements for a complement substitution. As a result, the leading bit, $v_6$=0, is concatenated to the end of the emitted sequence as $e_3$=0. The next six registers (i.e., register states) also do not contain subsequences of either five ones or five zeros, and so $e_4 \ldots e_9$=$v_7 \ldots v_{12}$=111100. In contrast, the final five bits of the visitation sequence, $v_{13} \ldots v_{17}$, do contain only ones, and therefore $e_{10}e_{11}$=00. At this point the emitted sequence is '11011110000', and the simulation may be stopped since the next bit register, $v_1v_2v_3v_4v_5$, is a duplicate of the exchange function's very first register. Were the operation to continue, the emitted sequence bits, $e_1e_2 e_3 \ldots e_{11}$, would repeat and so, after being fully formatted, the emitted sequence is recorded as E00001101111. In some sense, this exchange function reverses the lobe-labeling of the double scroll oscillator, and hence that of the control planes for the chaotic control scheme above. As such, one cupolet interacting by way of a Complement exchange function requires for entanglement a specific contribution from the opposite lobes of a second interacting cupolet. Entanglement generated through the Complement(3,2) exchange function is depicted in FIGS. 6A and 6B.

Another class of exchange function, the NOutOfMtoL(N, M,L) category, combines properties of both the IntegrateAndFire and Preponderance functions where bits of a visitation sequence represent units of binary energy. Exchange functions in this category effectively compare binary energy against two thresholds by emitting zeros whenever the energy levels falls below the lower threshold (e.g., the value (M−N) for N>M/2) and ones if the energy is above the upper threshold (i.e., at least N, assuming N>M/2). In other words, if at least N-many ones or N-many zeros are found inside the M-bit register, then that entire register block is converted into a sequence of L-many ones or zeros, respectively. In contrast, Preponderance and IntegrateAndFire exchange functions compare energy against a single threshold. After either result, the register resets by replacing all of its bits with the next block of M-many visitation sequence bits. For energy in between the two threshold levels, NOutOfMtoL functions append the leading register bit directly to the emitted sequence without modification. This is similar to the IntegrateAndFire functions. Any cupolet that thus traverses its energy lobe frequently enough accumulates the required amount of binary energy necessary for inducing the NOutOfMtoL(N,M,L) function to emit a sequence of ones as control code bits. The more a cupolet visits its energy lobe, the greater the influence it may potentially have on other cupolets. It is the opposite case for the neutral (zero) lobe.

By way of example, NOutOfMtoL(4,5,3) is applied to the visitation sequence, $Vv_1v_2v_3 \ldots v_{18}$=V010010001110110111. In this scenario, if at least N=4 ones (energy bits) accumulate inside an M=5-bit register, the response is L=3-many ones, but if the energy level is less than or equal to 1 (equivalently, at least N=4 zeros are present), the response is L=3 zeros. The initial register state is $v_1v_2v_3v_4v_5$=01001, and since no more than three zeros or ones are present, the threshold is not satisfied and $e_1=v_1=0$. The register bits then shift to the left one bin to admit $v_6=0$, but still not enough zeros or ones are available so $e_2=v_2=1$. The next register is $v_3v_4v_5v_6v_7=00100$, which meets the threshold condition for the number of zeros to be in the register, meaning $e_3e_4e_5=000$ are concatenated to $e_1e_2$. Equivalently, the energy inside the register, one bit, has fallen to the lower threshold. The register then resets to accumulate the block, $v_8v_9v_{10}v_{11}v_{12}=01110$, which does not contain enough zeros or ones and $e_6=v_8=0$. The next register is $v_9v_{10}v_{11}v_{12}v_{13}=11101$, and this time, the minimum number of ones is satisfied so $e_7e_8e_9=111$. After resetting, the subsequent register, $v_{14}v_{15}v_{16}v_{17}v_{18}=10111$, contains the minimum four units of energy which makes $e_{10}e_{11}e_{12}=111$. Because the next register $v_1v_2v_3v_4v_5$, repeats this exchange function's first bit register, one complete period of the emitted sequence has now been determined. Simulation of the exchange function is thus stopped and the fully formatted emitted sequence, E010000111111 is observed.

Three other categories of exchange functions are all very similar in that they modify subsequences of a visitation sequence provided that the subsequences contain a certain number of ones or zeros. If so, then the subsequences are either reduced or expanded depending on the L-parameter of the exchange function. The Ones(M,L) category modifies only subsequences of ones, the Zeros(M,L) category modifies only subsequences of zeros, and the ZerosAndOnes(M, L) categories modifies both. The ZerosAndOnes(M,L) category is described below, since the remaining two may be considered special cases of these exchange functions.

In the ZerosAndOnes category, visitation sequences pass through an M-bit register until the register encounters a subsequence consisting either of M-many ones or M-many zeros. The subsequence is then converted into a corresponding sequence of L-many ones or L-many zeros, respectively. In other words, M-many ones (zeros) are replaced by L-many ones (zeros) and no complement operation is performed. After the conversion, the register clears its bins and accumulates the next block of M-many bits from the visitation sequence. If no such subsequence is found inside the register, the leading bit is taken without modification to be the next bit of the emitted sequence. Each bit in the register then shifts forward to leave one bin available for the next bit of the visitation sequence. After each response, the same analysis process is repeated. To see this, if the visitation sequence V00000011110011111 is sent to the ZerosAndOnes(4,2) exchange function the result will be the emitted sequence $Ee_1 \ldots e_{11}$=E00001100111. Observe that the first four bits of the visitation sequence make up a block of M=4 zeros and are thus reduced to the L=2 zeros, $e_1e_2=00$. The register then accepts bits $v_5 \ldots v_8$, but neither four ones nor four zeros are present so the first register bit is passed to the emitted sequence as $e_3=v_5=0$. It is the same outcome once the visitation sequence slides forward one bit whereupon $v_6v_7v_8v_9=0111$ make up the register, and so $e_4=v_6=0$. The fourth register consists of $v_7v_8v_9v_{10}=1111$, a subsequence of four ones, which means that $e_5e_6=11$. The next two registers are $v_{11}v_{12}v_{13}v_{14}=0011$ and $v_{12}v_{13}v_{14}v_{15}=0111$ (so $e_7=0=e_8$), but the subsequent register is $v_{13}v_{14}v_{15}v_{16}=1111$. Therefore, $e_9e_{10}=11$. Since only one bit, $v_{17}$, remains from the visitation sequence, periodicity is applied in order to fill all four register bins. The entire visitation sequence is therefore concatenated to $v_{17}$, and the subsequent register becomes $v_{17}v_1v_2v_3=1000$, giving $e_{11}=1$. After the visitation sequence advances one bin through the register, its first bit, $v_1$, is located now in the register's first bin. The numerical simulation of the exchange function is thus stopped as it has returned to the beginning of the visitation sequence (otherwise, the emitted sequence simply would end up repeating itself). As anticipated, the sequence E00001100111 is obtained, which is already fully formatted.

Exchange functions belonging to the Ones(M,L) and the Zeros(M,L) categories follow a similar modification procedure, but only modify subsequences of ones or zeros, respectively, while leaving subsequences that consist of M-many zeros or ones unchanged. For instance, if V00000011110011111 is sent to the Ones(4,2) and Zeros(4, 2) functions, the resulting emitted sequences are E0000001100111 and E000011110011111 respectively.

Figure 8A:
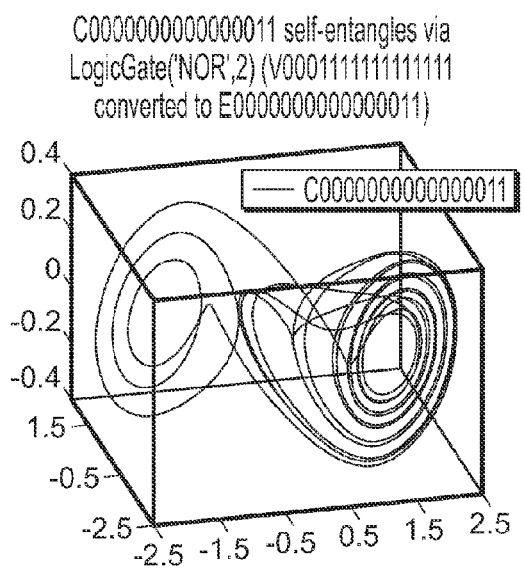
FIGS. 8A-8D together depict various self-entangled and cross-entangled cupolets in accordance with an arrangement.
Figure 8B:
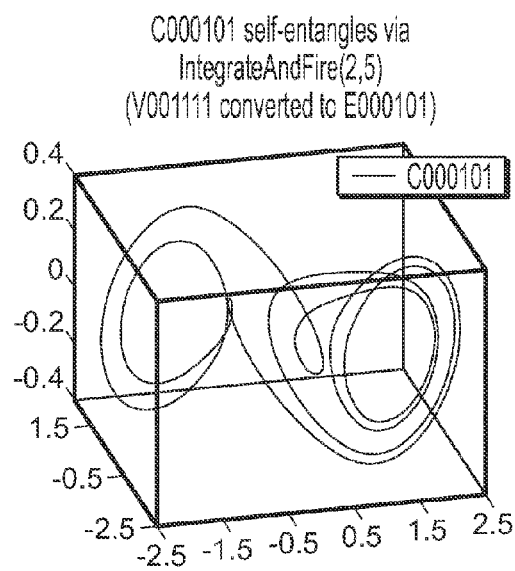
Figure 8C:
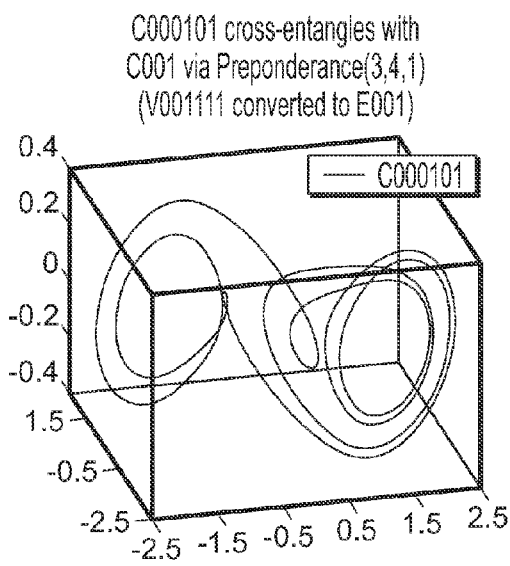
Figure 8D:
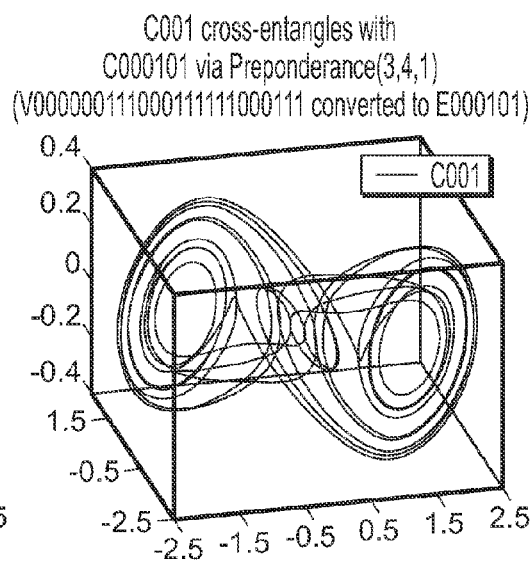

The double scroll system for entanglement has been investigated by applying over 900 exchange functions from 10 major categories. Entanglement has been observed between over 500 cupolets and certain entanglement types have been classified. Cross-entanglement refers to entanglement between two different cupolets while entanglement between copies of the same cupolet is called self-entanglement. FIGS. 8A-8D together depict various self-entangled and cross-entangled cupolets in accordance with an arrangement. In particular, FIGS. 8A and 8B depict self-entanglement, while FIGS. 8C and 8D depict cross-entanglement. The exchange functions used to produce the entanglement are LogicGate('NOR',2) (FIG. 8A), IntegrateAndFire(2,5) (FIG. 8B), Preponderance(3,4,1) (FIGS. 8C and 8D), respectively. That is, the cupolets in FIGS. 8A and 8B exhibit self-entanglement through LogicGate and IntegrateAndFire exchange functions, respectively, while the cupolets in FIGS. 8C and 8D cross-entangle with each other via a Preponderance function.

A few observations may be made based on the above described and other results. First, entangled cupolets need not share the same periods, nor even be integer multiples of each other's period, as is demonstrated by the entangled cupolets of FIGS. 8C and 8D, which are of periods 22 and 24, respectively. Also, there are several cupolets that entangle more frequently than others and many of these are symmetric about the origin. The period-4 cupolet C01, one of the simplest, self-entangles under many categories of exchange functions, as does C00101101, period-16, but mainly via several variations of Preponderance functions.

Furthermore, cupolets that entangle under one exchange function may entangle with entirely different cupolets under others. This is illustrated in FIGS. 8A-8D as well, where C000101 self-entangles via an IntegrateAndFire function and cross entangles with C001 under a Preponderance function. Finally, it has been observed that some exchange functions generate more entanglement than others, while there are some that have not fostered any. Neither the LogicGate('NOR', L) nor the Zeros(M, L) exchange functions have induced any entanglement, quite unlike the IntegrateAndFire category, which has produced over 120 instances of both cross and self-entanglement. There also seems to be little connection between whether an exchange function engenders more self-entanglement or cross-entanglement. For instance, the vast majority of entanglement that an IntegrateAndFire generates is self-entanglement, whereas nearly a quarter of Preponderance entanglement occurs between different cupolets.

A number of concerns invariably arise when examining a quantum system for entanglement. The following discussion describes these properties and suggests that classical nonlinear systems are capable of supporting what may appear to be nonclassical behavior. An important concept in quantum mechanics is the idea that making a measurement causes the collapse of a system's associated wavefunction. This has a direct analog in our study of cupolet entanglement and is supported by the following three observations.

First, a chaotic system in isolation has the property that its system dynamics occur on its attractor, and yet the dynamics are aperiodic for all time. Cupolets represent approximate periodic orbits of the system, and, while the periodic orbits are dynamical solutions of the defining equations, they are all unstable. Second, when controls are applied to a chaotic system, cupolets arise because of two unexpected properties of chaotic systems: the system stabilizes onto a cupolet under the influence of a set of periodic perturbations and this stabilization is independent of the initial state of the system. Third, consider that a measurement process applied to any system that exists at the scale where either chaotic and quantum effects may be observed is likely to perturb the system in some prescribed fashion. It is thus asserted that a measurement process would have an effect similar to the control process that is used to generate the cupolets, and so cupolet stabilization represents an analog of the collapse of a "wavefunction" onto a specific state.

Accordingly, one can consider the cupolets to be the "states" of a chaotic system. This is reasonable since the natural measure for a chaotic system is often described as being concentrated on its UPOs. Collectively, cupolets provide a great deal of information about their associated dynamical system. An isolated, aperiodic chaotic system may thus be viewed as existing in a "mixed state" that is a linear combination or superposition of cupolet states, but when a measurement is made, a particular cupolet would be stabilized and the collapse of the wavefunction onto a particular state would be said to have occurred. This view is further supported by the fact that for many low-dimensional chaotic systems, such as the double scroll system, the chaotic attractor is locally a ribbon-like structure in at least part of its domain. The orbits of the chaotic dynamics are therefore restricted by uniqueness considerations to paths that are (at least locally) bounded by UPOs (e.g., cupolets), and so it is a straightforward step to consider the chaotic dynamics to be linearly dependent on the local UPOs.

Furthermore, the concepts of measurement and collapse to a specified state of a system would not be restricted only to external measurements or controls but could well occur naturally. Isolated chaotic systems in general evolve aperiodically (since the periodic orbits are unstable) but, in part because the support of the measure for chaotic systems is concentrated on their UPOs, chaotic systems tend to dwell longer on their UPOs. Consequently, these systems are visiting and tracking along their cupolets infinitely often. If this behavior leads to stabilizing a cupolet that exhibits the ability to entangle and can also communicate control information to a second chaotic system, and if this interaction is as successful in the reverse direction, then these two systems would naturally become entangled.

Unless it is disturbed, their continued interaction would cause them to forever remain in a stabilized entangled state. If cupolets are allowed to interact in the manner described in this paper, then independent chaotic systems would be able to act on each other with the interactions themselves playing the role of the controls or measurements. It is therefore possible that entanglement could occur spontaneously. It may even be possible to investigate the probabilities of entanglement under different scenarios via a method similar to scattering cross-sections. The potential for spontaneous entanglements will play a role in the interpretation of making measurements on individual members of an entangled cupolet pair, as is discussed below.

Next is described the potential for a knowledgeable measurement on a chaotic system, as opposed to a blind measurement. If one has knowledge of the control scheme for the cupolets and access to measurement tools that are smaller than the scale of the control bins, then knowledge of the system dynamics and control scheme make it possible for one to monitor the state of the chaotic system without disturbing a cupolet. If, however, one were to make a blind measurement on a cupolet, for example, a measurement that effectively changes a single 1 control bit to a 0 control bit or vice versa, then the cupolet's stabilization would be lost. The system would either revert to aperiodic chaotic behavior or stabilize again after a (potentially very long) transient period. Blind measurements are therefore likely to perturb or destroy cupolets.

Consider now the case of a pair of entangled cupolets, where the cupolets have become entangled either through preparation of an entangled state or through spontaneous entanglement. If a measurement is conducted on one member of the entangled pair, then the state of the other member would be known with certainty (with the proviso that only one unique pairing is found at this point). However, if the measurement process involves blind measurements, then the communication between the members of the entangled pair would likely be broken and the two systems would then evolve independently. Similarly, if one postulates that the communication between members of an entangled pair is limited by distance, then, if the members are separated too far, the systems would drift away from the entangled pair states. This drift would not necessarily be very rapid, as it would be determined by the local Lyapunov exponents of the cupolets. So, the "knowledge" that the two chaotic systems had previously been entangled would not be "erased" immediately and a measurement conducted on one member of the entangled pair would thus be predictive of the state of the second system, although the accuracy of the prediction would decay over time.

A discussion of the applicability of Hilbert space considerations follows next. In quantum mechanics, the presence of a Hilbert space of states is often taken as a starting point in any analysis. For instance, a typical way to express a Hilbert space of states would be to define the Fourier modes of the system. Then one could postulate linear combinations of sinusoids to define the state; however, for chaotic systems, the only meaningful states are solutions of the governing dynamics, and these states are the cupolets (or, more precisely, cupolets are close approximations of the states). Since there are many thousands of cupolets that can be isolated, they would appear to form an over determined set of basis elements.

In a scenario where the cupolets have been isolated and collected through measurement, if one were to take the time series associated with each cupolet, the resulting spectrum collection would in general be extremely diverse. As previously illustrated in FIG. 4, the simplest cupolets have essentially one or two significant spectral peaks, but more complex cupolets have tens or hundreds of significant peaks in their spectra. Hence, while measurements would make it appear that Fourier modes and the related Hilbert space ideas should hold, the reality is that the cupolets are overdetermined and do not satisfy any simple orthogonality principle. Cupolets do, however, represent the states of the system more accurately. Moreover, the principles of quantum mechanics dictate that making any measurement on a system immediately alters its state. This is problematic for researchers when determining the actual state of a quantum system.

Chaotic entanglement, if found, could help in preparation of states for experiments. If it were possible to use chaotic control methods to stabilize systems, then it might be possible to produce systems in the "same" state prior to experimental measurements, and this would allow experimenters to probe further into the classical—quantum transition. Discussions of entanglement in quantum mechanics sometimes address measurements of the entropy of the system. The disclosure herein focuses on the actual states of the chaotic systems, rather than on a measurement such as the entropy of a system. However, it is possible to define entropy in chaotic systems according to the methods of Kolmogorov. Kolmogorov entropy quantifies the rate of growth of information as a dynamical system evolves over time. Such information is usually encoded in the system's symbolic dynamics, which means that this type of entropy is therefore related to the growth rate of sequences produced by the system dynamics. For example, even though it would repeat forever, a periodic sequence of length N would be assigned zero entropy because its rate of growth of sequences becomes zero once N exceeds its period.

For chaotic systems, since the dynamics of the system never repeat, the sequences of symbolic dynamics that arise as the system evolves are never periodic. However, the regularity of the geometric structure is such that the rate of growth of sequences of length N is finite and thus the entropy is finite. For truly random systems, the rate of growth of sequences goes to infinity—in the sense that as the length of the sequence is increased, all possible sequences are realized. For the double scroll oscillator, the binary visitation sequences would provide such a symbolic dynamics. Cupolets in their natural, uncontrolled, and isolated state, would thus be generating entropy at a finite rate. Once they are controlled according to the control scheme, or if they enter into an entangled state, they immediately stabilize onto a periodic orbit and subsequently have zero entropy from that point onward. In this way, cupolet entanglement does admit notions of entropy and is effectively an entropy-reversing operation. In summary, the properties of chaotic entanglement share some of the concepts that appear in discussions of quantum entanglement. There are a number of differences as well, and such differences may be used to detect whether an observed entanglement is produced by a quantum process or whether there is an underlying chaotic process at work.

Next is outlined a search procedure for actually observing cupolet entanglement. First, a large library of cupolets is generated using the aforementioned control scheme. For instance, over 8,000 cupolets may be generated by applying all possible 16-bit control codes to the double scroll oscillator. After selecting an exchange function and its parameters, each cupolet's visitation sequence is computed and then fed into the exchange function to create a library of emitted sequences. The exchange function is simulated until a single period of the emitted sequence is obtained (excluding transient bits). Since each cupolet's control code and emitted sequence are labeled by their respective control code or sequence bits, actually detecting entanglement between pairs of cupolets essentially amounts to a thorough file search between these two libraries. As described above, the goal is to find a pair of cupolets whose emitted sequences match each other's control codes, in which case the two cupolets are considered chaotically entangled.

The cupolet entanglement process may be modified to allow for a cupolet to entangle with multiple other cupolets in a natural way. This is an application of cupolet entanglement which is made possible essentially by identifying the bits of a cupolet's control code that are applied at each of the two control planes. In doing so, two additional visitation sequences, specific to each lobe, are created that indicate if a cupolet is on or off one particular lobe, and subsequently off or on the opposite lobe. As before, these visitation sequences may be converted to emitted sequences by an exchange function and, since they are specific to a particular lobe, are used to stabilize lobes of other cupolets.

Consequently, a control code, visitation sequence, and emitted sequence are associated to each lobe of a cupolet and will be referred to as local in order to distinguish them from a cupolet's original control code, visitation sequence, and emitted sequence, respectively. The result is that the 1-lobe of one cupolet becomes available to entangle with the 0-lobe of another cupolet, and vice versa. Chains of entangled cupolets may then be linked together with entanglement playing the role of a bonding agent.

A cupolet's visitation sequence represents the order of lobes that the cupolet visits and consequently the order in which the cupolet intersects the two control planes. It is at these intersections that a cupolet is controlled by the control scheme as instructed by the bits of its control code. Control code bits may thus be dichotomized according to which control plane they are applied. To ascertain which control bits are applied at which control plane, a cupolet's control code must first be repeated (if necessary) in order to have the same length as its visitation sequence. This synchronizes the two sequences so that a '1' in the visitation sequence indicates that the corresponding bit in the control code would be applied at the 1-lobe control plane, and similarly for a '0'. Caution must be taken to ensure that the ensuing control bits local to each lobe remain in synchrony with the visitation sequence.

For instance, if a perturbation is known to be applied on the 0-lobe (as indicated by the appropriate bit of the visitation sequence), then, at this instance of the visitation sequence, no perturbation could be made at the 1-lobe. This is because a cupolet cannot traverse both lobes simultaneously. As a result, a '0' is inserted into the series of control bits local to the 1-lobe, while otherwise maintaining the order of these bits. Similarly, a '0' is inserted into the 0-lobe control bits whenever a corresponding control is made at the 1-lobe control plane. Recall that a '0' in a control code instructs the control scheme not to perturb a cupolet that is being controlled. Therefore, inserting a '0' into these sequences of lobe control bits simply acts as a delay or placeholder that synchronizes the two series of lobe control codes synchronized to each other and to the visitation sequence. Two local control codes, $C_0$ and $C_1$, are defined that indicate with a '1' if and at what instance in the visitation sequence a perturbation would be applied on the particular lobe that is referenced by the subscript. Individually, the two control codes, $C_0$ and $C_1$, guarantee a cupolet's stability as it traverses around one specific lobe.

As an example, the cupolet C0110111 has a control code of length 7 and a visitation sequence of length 14, V00001111111111. The control code is repeated twice so that bits of the control code align with bits of the (unformatted) visitation sequence for easy comparison:
C01101110110111
V11111110000111
It is now easy to see that the bits of the control code associated with the 1-lobe control plane are '0110111' and '111', and that the 0-lobe control bits are '0110'. Inserting the delay zeros gives us $C_0$=00000000110000 and $C_1$=01101110000111. Bits of this cupolet's control code have thus been successfully isolated according to what lobe they are applied and without compromising the order in the cupolet's visitation sequence that they are applied. Were one to work backwards, the cupolet's control code could be recovered from using $C_0$, $C_1$, and its visitation sequence.

Note that a '1' in a visitation sequence indicates that the cupolet is traversing its 1-lobe and hence is off of its 0-lobe, and conversely for a '0' in the visitation sequence. From this, two local visitation sequences, $V_0$ and $V_1$, are defined that associate to each lobe an on-off relationship: a '1' in either $V_0$ or $V_1$ indicates that the cupolet is on the lobe associated with the subscript and off of the opposite lobe (and conversely with a '0'). In the above example, the cupolet C0110111 traverses its 1-lobe seven times (so $V_1$ or $V_0$ begin as '111111' and '0000000', respectively), followed by four loops around its 0-lobe, followed by three more loops around the 1-lobe. This gives $V_1$='11111110000111' and $V_0$='00000001110000'. The sequences $V_0$ and $V_1$ therefore serve as visitation sequences local to each lobe as they individually reveal if the cupolet is on or off a particular lobe. It is true that $V_1$ is equal to the cupolet's original visitation sequence, that $V_0$ is the binary complement of $V_1$, and that all three sequences are the same length.

At this point, one control code and one visitation sequence are associated locally to each lobe, and, as a result, each lobe may be considered individually for cupolet entanglement. This allows the two lobes of one cupolet to each entangle with lobes of other cupolets. For this to occur, an exchange function is again used for inducing and then preserving the cupolet entanglement at each lobe. In keeping with the descriptions of cupolet entanglement as described previously, the two local visitation sequences, $V_0$ and $V_1$, are thus converted by a single same exchange function into local emitted sequences, $E_0$ and $E_1$.

Similar to the previous process of cupolet entanglement, where an emitted sequence is taken as a control code and used to stabilize another cupolet, $E_0$ and $E_1$ are also employed as control codes that are used to stabilize individual lobes of other cupolets. To make this process more in tune with actual physical interactions, such as the north-south pull of a magnet or the positive-negative charge interactions between protons and electrons, it is specified that lobes of two cupolets may entangle provided that the lobes are complementary. The result is that the 1-lobe of one cupolet becomes available to entangle with the 0-lobe of another cupolet, and vice versa.

Figure 9:
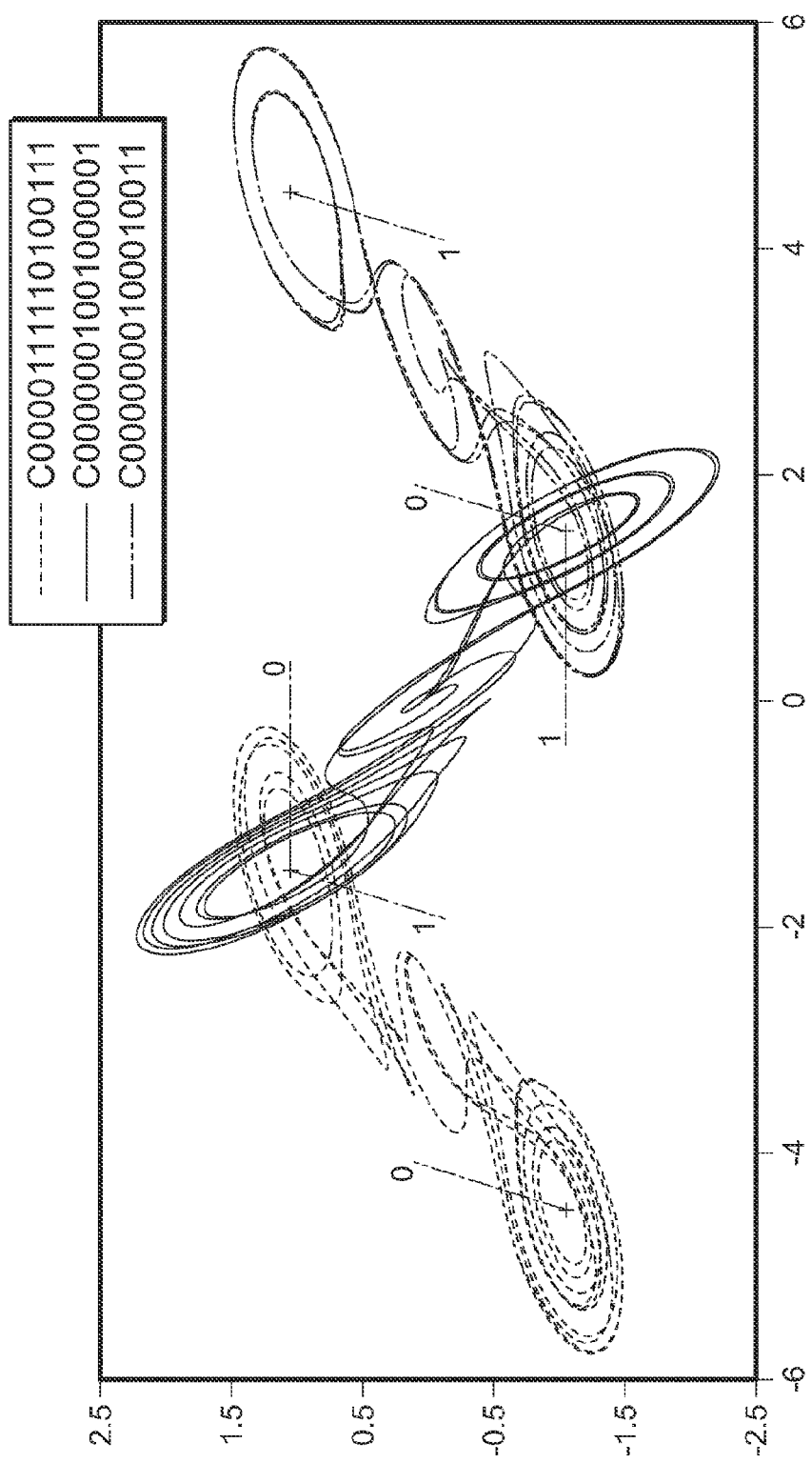
FIG. 9 illustrates a basic lattice of three entangled cupolets in accordance with an arrangement.
Figure 11A:
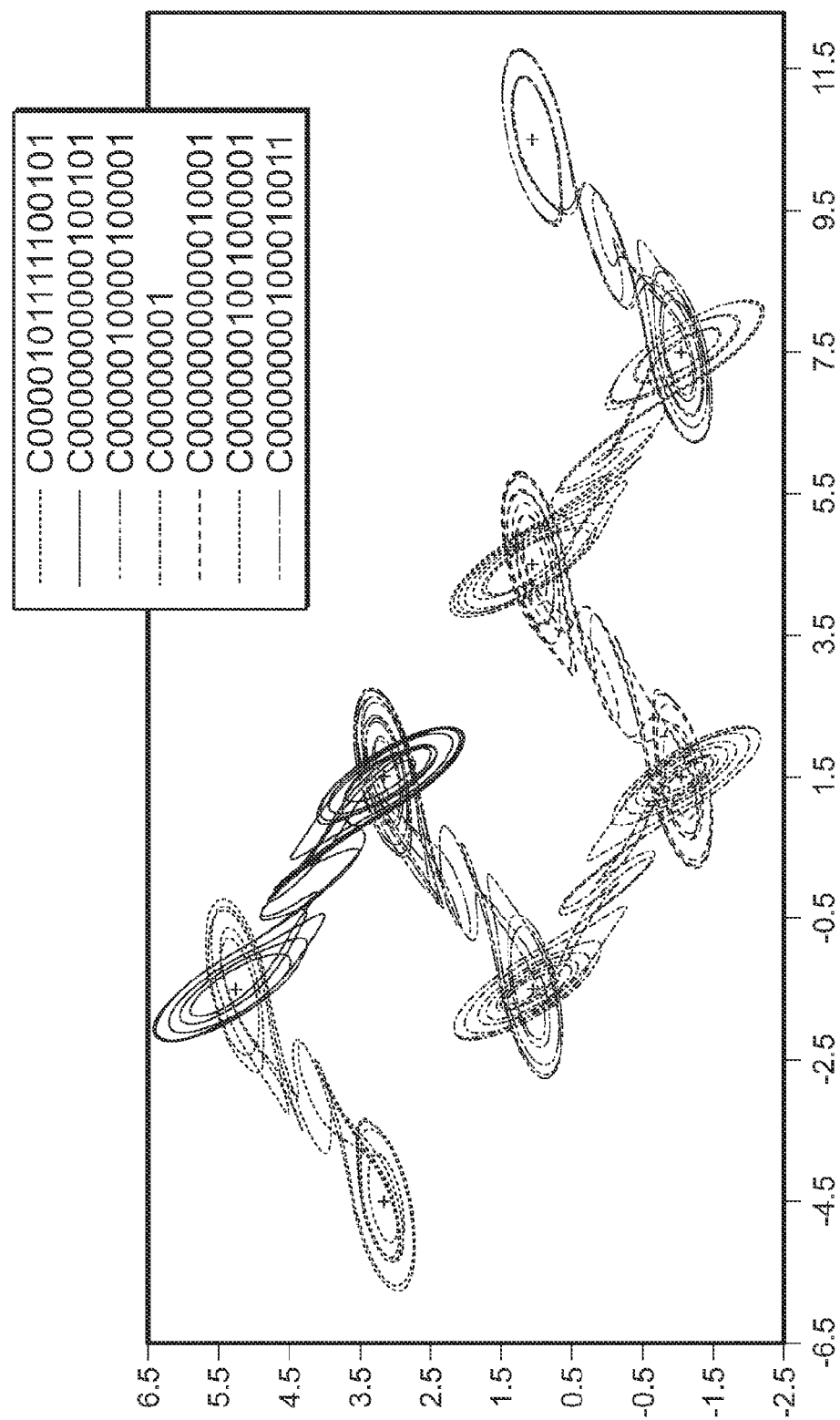
FIGS. 11A and 11B depict a chain of seven entangled cupolets and a loop of five entangled cupolets, respectively, in accordance with an arrangement.
Figure 11B:
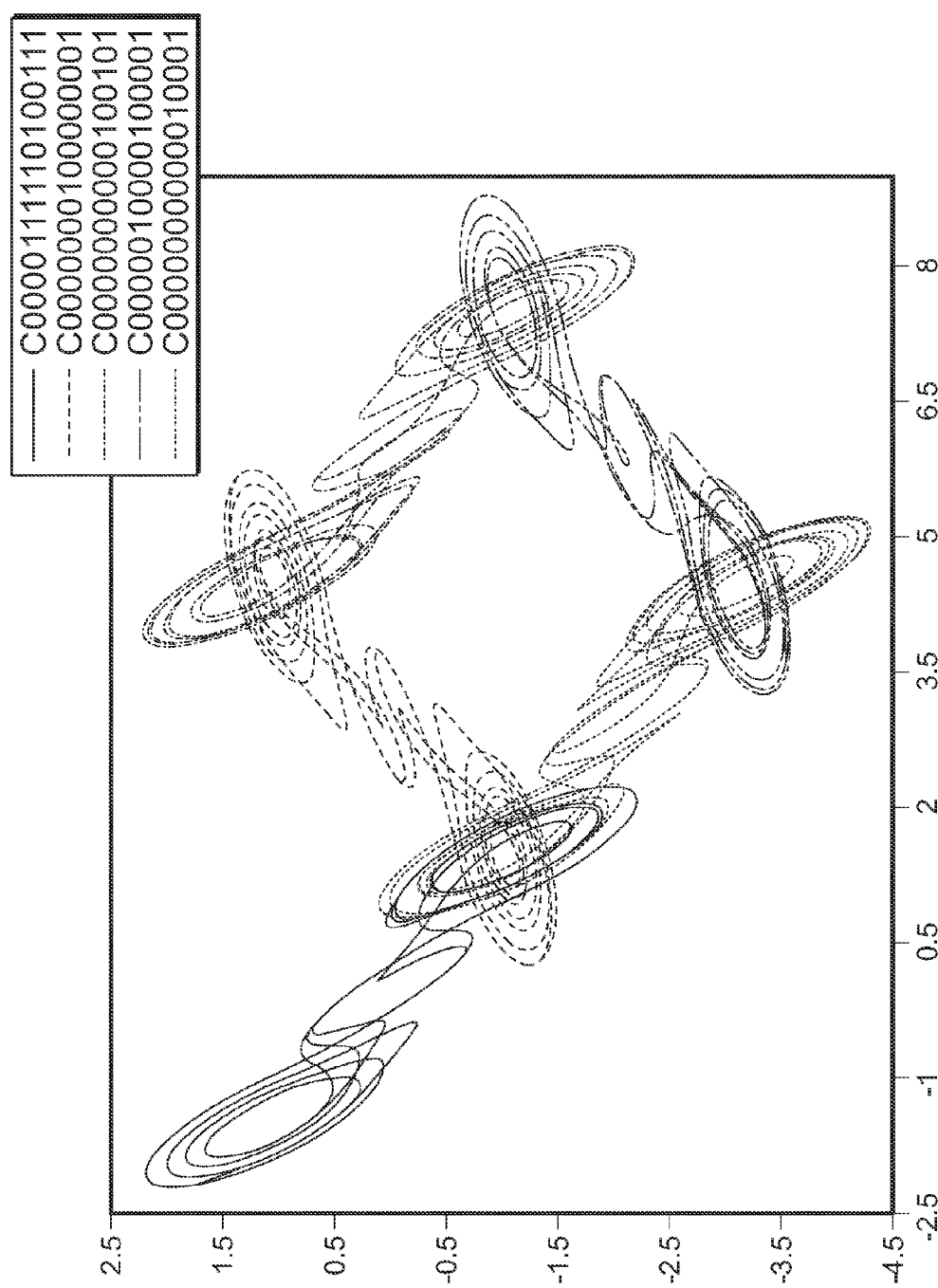

FIG. 9 illustrates a basic lattice of three entangled cupolets in accordance with an arrangement. Specifically, a chain of three entangled cupolets, C0000111110100111, C0000001001000001, and C0000000100010011, are depicted, whose opposite lobes have all been aligned at their appropriate fixed points. The entanglement is generated by the IntegrateAndFire(5,8) exchange function. The respective local control codes, visitation sequences, and emitted sequences that pertain to each lobe of this trio of cupolets are listed in table of FIG. 10. In particular, FIG. 10 depicts information for entangled cupolets C0000111110100111, C0000001001000001, and C0000000100010011 in accordance with an arrangement. Further, additional examples of entangled cupolets lattices are illustrated by FIGS. 11A and 11B. In particular, FIGS. 11A and 11B depict a chain of seven entangled cupolets and a loop of five entangled cupolets, respectively, in accordance with an arrangement. Specifically, an IntegrateAndFire(5,8) exchange function is used to generate both FIGS. 11A and 11B.

For instance, the 1-lobe of cupolet C0000111110100111, seen as the leftmost cupolet of FIG. 9, entangles with the 0-lobe of the central cupolet, C0000001001000001. This is first a consequence of the 1-lobe emitted sequence of C0000111110100111 exactly matching the 0-lobe control code of C0000001001000001, as confirmed by the table of FIG. 10, where $E_1$=0000000000000001 for C0000111110100111 and $C_0$=0000000000000001 for cupolet C0000001001000001, and is secondly a consequence of the 0-lobe emitted sequence of the central cupolet exactly matching the 1-lobe control code for the left most cupolet; that is, $E_0$=0000000000000001 of C0000001001000001 matches $C_1$=0000000000000001 of C0000111110100111.

At the same time, the 1-lobe of this central cupolet, C0000001001000001, entangles in a similar fashion to the 0-lobe of the right most cupolet, C0000000100010011, as illustrated in FIG. 10 and indicated in the table of FIG. 10. In this case, $C_1$=0000000010000001 for C0000001001000001 and $E_0$=0000000010000001 for C0000000100010011 while $E_1$ and $C_0$ are both '0000000000000001' for C0000001001000001 (central cupolet) and C0000000100010011 (right cupolet), respectively.

FIG. 12 depicts an illustrative process 1200 for maintaining a pair of cupolets in a state of mutual stabilization in accordance with an arrangement. At 1210, a first cupolet and a second cupolet are generated. The first cupolet and the second cupolet may be generated using any suitable technique, e.g., using any technique described in the disclosure herein. At 1220, a first control code is applied to the first cupolet for a first time to produce a first visitation code. In an arrangement, the first visitation sequence is produced as a trajectory of the first cupolet evolves one full period about an attractor of the first cupolet. In an arrangement, applying the first control code to the first cupolet for the first time to produce the first visitation code includes applying a macro-control to a trajectory of the first cupolet in response to determining that a trajectory of the first cupolet crosses a control plane if a corresponding bit of the first control code is '1' valued, and applying a microcontrol to the trajectory of the first cupolet in response to determining that the trajectory of the first cupolet crosses the control plane if the corresponding bit of the first control code is '0' valued. In an arrangement, application of the first control code to the first cupolet for the first time stabilizes the first cupolet.

At 1230, the first visitation code is produced to an exchange function, which produces a second control code. In an arrangement, the exchange function is implemented as circuitry which outputs a binary valued second control code based on the first visitation code. At 1240, the second control code is applied to the second cupolet to produce a second visitation code. At 1250, the second visitation code is transformed based on the exchange function to produce, again, the first control code. At 1260, the first control code is applied to the first cupolet for a second time. In particular, in some arrangements, applying the second control code to the second cupolet and applying the first control code to the first cupolet for the second time stabilizes a combined trajectory of first cupolet and the second cupolet and maintains the first cupolet and the second cupolet in a state of mutual stabilization.

FIG. 13 depicts an illustrative process 1300 for creating a multi-cupolet entanglement among a plurality of more than two chaotic systems in accordance with an arrangement. At 1310, first controls are applied to a '0'-valued lobe of a first chaotic system and second controls are applied to a '1'-valued lobe of the first chaotic system. In an arrangement, the first controls and second controls together causing the first chaotic system to produce a first visitation sequence associated with the '0'-valued lobe of the first chaotic system and a second visitation sequence associated with the '1'-valued lobe of the first chaotic system. At 1320, a first output is produced based on the first visitation sequence and a second output is produced based on the second visitation sequence. In an arrangement, the first visitation sequence and the second visitation sequence are provided to exchange function circuitry, which produces the first output in response to the first visitation sequence and the second output in response to the second visitation sequence. At 1330, the first output is applied as a control to a second chaotic system to produce an entangled state between a '1'-valued lobe of the second chaotic system and the '0'-valued lobe of the first chaotic system. At 1340, the second output is applied as a control to a third chaotic system to produce an entangled state between a '0'-valued lobe of the third chaotic system and the '1'-valued lobe of the first chaotic system.

Certain additional aspects of implementing chaotic entanglement are now described. First, a memory device may be designed based on entangled cupolets and used to store and read binary information in a non-destructive manner that preserves the entanglement. Second, a wide variety of exchange functions may be used for cupolet entanglement, so that the exchange functions may be implemented to achieve a desired degree of computational complexity, e.g., by using linear feedback shift registers as the building blocks or through an FIR filter implementation. Third, basic logic gates may be developed using entangled cupolets (e.g., to form AND, OR, NAND and NOR gates). In particular, logic gates may be implemented by disturbing entanglement in a controlled manner, and then reacquiring entanglement. With such a mechanism, a wider range of computational abilities would result. For instance, if a 1-bit is input, then entanglement would ensue, and if a 0-bit is input, the entanglement would not be perturbed.

For example, an AND gate may be created for an entangled pair of cupolets for which an input of two 1-bits to the entangled pair causes detectable deviations from the entangled state, and for which an input of two 0-bits or one 0-bit and one 1-bit results either in no deviation or deviation with the reacquistition of entanglement. As would be understood by one of ordinary skill, based on the disclosure and teaching herein, other two-input or higher input logic gates may be similarly designed by identifying entangled cupolets with deviation and reacquistition of entanglement properties corresponding to the truth tables of those gates. Further, more advanced logic gates may be implemented by exploiting re-entanglement. For example, in a two input system, a pair of 1-bit inputs would break the entanglement, while for a set of inputs with a 1-bit and a 0-bit, the entanglement would be disturbed but re-acquired, and a pair of 0-bit inputs would leave the entanglement undisturbed. Further, logic gates may be built by defining sets of entangled cupolets and transition paths between the sets of entangled cupolets, so that a set of N inputs, all taking on 0-bit or 1-bit values would cause the initial set of entangled cupolets to transition to a uniquely defined final state of entangled cupolets.

Figure 14A:
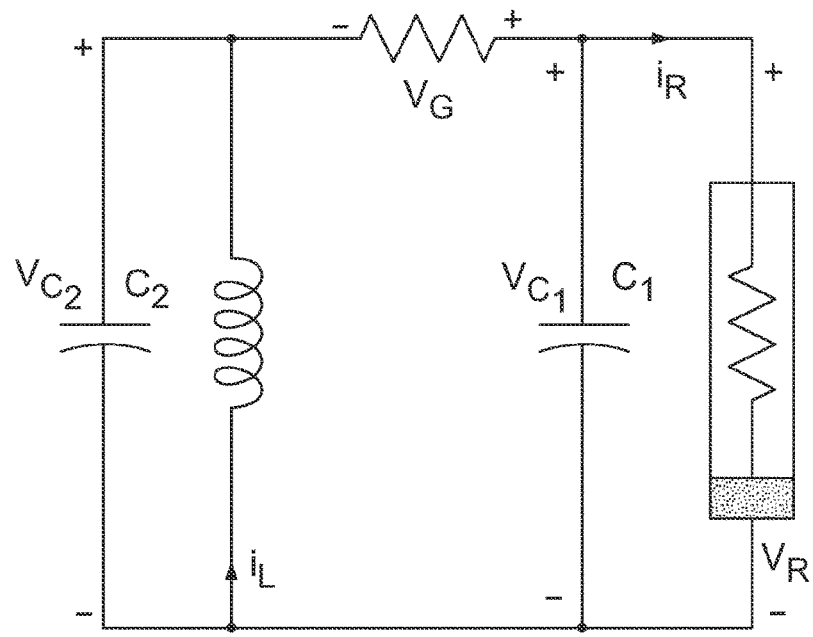
FIGS. 14A and 14B depict an electrical schematic and nonlinear negative resistance $g(v)$, respectively, of Chua's circuit in accordance with an arrangement.
Figure 14B:
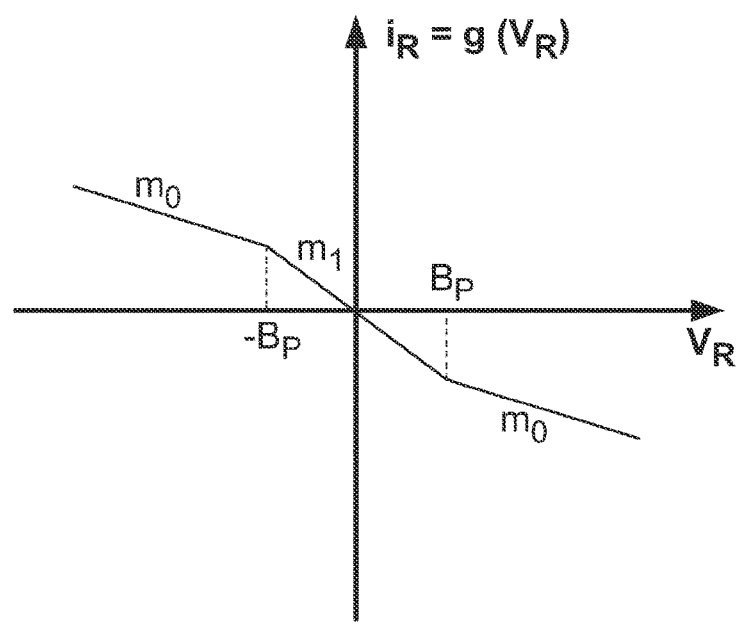

Continuing discussion of chaotic entanglement implementations, the double-scroll oscillator described earlier can be implemented in hardware using a very simple electronic circuit, known as Chua's circuit, that generates the chaotic behavior. In particular, FIGS. 14A and 14B depict an electrical schematic and nonlinear negative resistance g(v), respectively, of Chua's circuit in accordance with an arrangement. As depicted in FIG. 14A, Chua's circuit is a 5-element, autonomous, uncoupled circuit, and may be easily constructed in 30 minutes for less than $10 USD. This has led to the successful integration of the entire Chua's circuit into a single monolithic chip and consequently making it available for mass production. One chip design occupies an area of approximately 1.5 mm$^2$ and requires a single 9V battery to disperse 0.001 Watts of power. Further, an entire array of Chua circuits may be fabricated as monolithic chips—at one point, 10,000 Chua's circuits had been assembled onto a single chip. The availability of Chua circuitry provides a hardware platform for implementing the control methods necessary for chaotic entanglement by injecting control circuitry and coupling independent Chua circuits through particular exchange functions. The exchange functions can all be easily produced in hardware using shift registers, integrators, filters, etc. The approach proposed here has the unique benefit that the control mechanism that produces the cupolets also has the effect of making the process more robust and this robustness plays a key role in the viability of the technology.

While there have been described systems and methods for achieving entanglement in chaotic systems, it is to be understood that many changes may be made therein without departing from the spirit and scope of the invention. For example, many other types of orbits besides the specific types of cupolets described above may be used for signal analysis according to the invention, such as any of the tens of thousands of different cupolets that can be produced by any of the various types of chaotic signal generators. Moreover, because compact cupolets can have rich structure and a wide array of oscillatory behaviors, it is to be understood that the most appropriate cupolet for the desired analysis may be chosen by adding one or more pre-selection steps to any of the processes and techniques described above, such that more rapid convergence can be expected, for example. Those skilled in the art will appreciate that the invention can be practiced by other than the described embodiments, which are presented for purposes of illustration rather than of limitation, and the invention is limited only by the claims which follow.

The invention claimed is:

1. Circuitry for creating an entangled cupolet pair, the circuitry comprising:
   exchange function circuitry; and
   control circuitry, the control circuitry is to:
   apply first controls to a first chaotic system, said first controls causing the first chaotic system to stabilize onto a first cupolet and produce a first visitation sequence,
   provide the first visitation sequence to the exchange function circuitry, the exchange function circuitry is to produce a first output in response to the first visitation sequence,
   apply the first output as a control to a second chaotic system to produce a second visitation sequence,
   provide the second visitation sequence to the exchange function circuitry, the exchange function circuitry is to produce a second output in response to the second visitation sequence,
   apply the second output to the first chaotic system, wherein the second output maintains the first cupolet and the second cupolet in an entangled state, and
   produce a second output in response to the second visitation sequence by:
   receiving, as input, a block of M bits of the second visitation sequence, wherein M is greater than or equal to one;
   outputting L '1'-valued bits in bit positions of the second output corresponding to the received block in response to a determination that at least N of the M most recent bits of the second visitation sequence are '1'-valued bits; and outputting L '0'-valued bits in bit positions of the second output corresponding to the received block in response to a determination that fewer than N of the M most recent bits of the second visitation sequence are '1'-valued bits, wherein L is greater than or equal to one.

2. The circuitry of claim 1, wherein:
the first visitation sequence and the second visitation sequence are each binary sequences, and
the exchange function circuitry is further to produce the first output by modifying the first visitation sequence according to a predefined binary sequence.

3. The circuitry of claim 1, further comprising storage circuitry, the storage circuitry is to store bit values of the first visitation sequence in a register of length P, and wherein the control circuitry is further to:
periodically extend the first visitation sequence to produce a periodic first visitation sequence of length P in response to a determination that a period of the stored bits of the first visitation sequence is of a length less than P; and provide the length P periodic first visitation code to the storage circuitry for storage in the register of length P.

4. The circuitry of claim 1, further comprising clearing a register storing bits of the second visitation sequence in response to the determination that at least N of M most recent bits of the second visitation sequence are '1'-valued bits.

5. The circuitry of claim 1, further comprising:
logic circuitry to receive a plurality of input signals; and
control circuitry to:
apply the plurality of input signals to the entangled cupolet pair;
determine a state of the entangled cupolet pair in response to the plurality of input signals; and
provide an output signal in response to the determined state.

6. The circuitry of claim 5, wherein the determined state is a deviation from an entangled state of the entangled cupolet pair prior to application of the plurality of the input signals to the entangled cupolet pair.

7. The circuitry of claim 5, wherein in response to the plurality of input signals, the entangled cupolet pair:
deviates from, but reacquires entanglement, in response to a first set of values of the plurality of input signals; and
breaks entanglement in response to a second set of values of the plurality of input signals.

8. The circuitry of claim 5, wherein the output signal is based, at least in part, on a transition of the entangled cupolet pair from a first entangled state to a second entangled state.

9. The circuitry of claim 1, further comprising:
input circuitry to receive an input for secure storage, the input corresponding to a cupolet control code;
control circuitry to store the control code by applying the control code to the cupolet pair to produce an entangled cupolet pair; and
read circuitry to receive a read request for the stored control code.

10. The circuitry of claim 9, wherein:
the read circuitry is further to output the stored control code in response to a predefined read request.

11. The circuitry of claim 10, wherein the cupolet pair breaks entanglement in response to a read request other than the predefined read request and thereby loses storage of the control code.

12. A method for maintaining a pair of cupolets in a state of mutual stabilization, the method comprising:
generating a first cupolet and a second cupolet;
applying a first control code to the first cupolet for a first time to produce a first visitation code;
transforming the first visitation code based on an exchange function to produce a second control code;
applying the second control code to the second cupolet to produce a second visitation code;
transforming the second visitation code based on the exchange function to produce the first control code; and
applying the first control code to the first cupolet for a second time,
wherein applying the first control code to the first cupolet for the first time to produce the first visitation code comprises:
applying a macrocontrol to a trajectory of the first cupolet in response to determining that a trajectory of the first cupolet crosses a control plane if a corresponding bit of the first control code is '1' valued; and
applying a microcontrol to the trajectory of the first cupolet in response to determining that the trajectory of the first cupolet crosses the control plane if the corresponding bit of the first control code is '0' valued.

13. The method of claim 12, wherein applying the second control code to the second cupolet and applying the first control code to the first cupolet for the second time stabilizes a combined trajectory of first cupolet and the second cupolet.

14. The method of claim 12, wherein the first visitation sequence is produced as a trajectory of the first cupolet evolves one full period about an attractor of the first cupolet.

15. The method of claim 12, wherein the application of the first control code to the first cupolet for the first time stabilizes the first cupolet.

16. The method of claim 12, wherein a period of a first output resulting from the first visitation code is an integer multiple of a period of the first control code.

17. A method for creating a multi-cupolet entanglement, the method comprising:
applying first controls to a '0'-valued lobe of a first chaotic system and second controls to a '1'-valued lobe of the first chaotic system, said first controls and second controls together causing the first chaotic system to produce a first visitation sequence associated with the '0'-valued lobe of the first chaotic system and a second visitation sequence associated with the '1'-valued lobe of the first chaotic system;
providing the first visitation sequence and the second visitation sequence to the exchange function circuitry, the exchange function circuitry is to produce a first output in response to the first visitation sequence and a second output in response to the second visitation sequence,
applying the first output as a control to a second chaotic system to produce an entangled state between a '1'-valued lobe of the second chaotic system and the '0'-valued lobe of the first chaotic system; and
applying the second output as a control to a third chaotic system to produce an entangled state between a '0'-valued lobe of the third chaotic system and the '1'-valued lobe of the first chaotic system.

18. The method of claim 17, further comprising applying additional controls to the first chaotic system or the second chaotic system and to the third chaotic system, said additional controls producing an entangled state between a '1'-valued lobe of the third chaotic system and a '0'-valued lobe of the second chaotic system.

19. A method for creating a multi-cupolet entanglement among a plurality of more than two chaotic systems, the method comprising:

for each chaotic system in the plurality of more than two chaotic systems:

applying controls to a '0'-valued lobe of the chaotic system and to a '1'-valued lobe of the chaotic system, said controls causing the chaotic system to produce a first visitation sequence associated with the '0'-valued lobe of the chaotic system and a second visitation sequence associated with the '1'-valued lobe of the first chaotic system;

producing a first output in response to the first visitation sequence and a second output in response to the second visitation sequence, applying the first output as a control to a first neighbor chaotic system in the plurality of chaotic systems to produce an entangled state between a '1'-valued lobe of the first neighbor chaotic system and the '0'-valued lobe of the chaotic system; and applying the second output as a control to a second neighbor chaotic system in the plurality of chaotic systems to produce an entangled state between a '0'-valued lobe of the second neighbor chaotic system and the '1'-valued lobe of the first chaotic system.

20. The method of claim 19, wherein the plurality of more than two chaotic systems comprises a first chaotic system having an lobe entangled with both a lobe of a second chaotic system and a lobe of third chaotic system, wherein the first chaotic system and the second chaotic system are two chaotic systems in a loop of entangled chaotic systems that includes at least one other chaotic system from the plurality of chaotic systems other than the first chaotic system.

* * * * *